(12) United States Patent
Sasaki et al.

(10) Patent No.: US 7,650,066 B2
(45) Date of Patent: Jan. 19, 2010

(54) DRIVING MECHANISM, PHOTOGRAPHIC MECHANISM AND CELLULAR PHONE

(75) Inventors: Ryota Sasaki, Saitama (JP); Mitsuo Manabe, Saitama (JP); Takeshi Ichimiya, Saitama (JP); Motoyoshi Tokumiya, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 405 days.

(21) Appl. No.: 11/387,774

(22) Filed: Mar. 24, 2006

(65) Prior Publication Data
US 2006/0232169 A1 Oct. 19, 2006

(30) Foreign Application Priority Data

| Mar. 31, 2005 | (JP) | ............................ P2005-103063 |
| Aug. 12, 2005 | (JP) | ............................ P2005-234517 |
| Nov. 24, 2005 | (JP) | ............................ P2005-338950 |
| Feb. 2, 2006 | (JP) | ............................ P2006-026252 |
| Feb. 17, 2006 | (JP) | ............................ P2006-041239 |

(51) Int. Cl.
*G03B 13/34* (2006.01)

(52) U.S. Cl. .................... 396/133; 310/15; 310/323.15; 310/327

(58) Field of Classification Search ................. 396/133, 396/185, 248; 359/824; 310/44, 326, 345, 310/348, 323.15
See application file for complete search history.

(56) References Cited

U.S. PATENT DOCUMENTS

| 4,604,168 A | * | 8/1986 | Liu et al. ..................... 205/165 |
| 5,013,956 A | * | 5/1991 | Kurozumi et al. ...... 310/323.11 |
| 5,589,723 A | | 12/1996 | Yoshida et al. |
| 5,768,016 A | * | 6/1998 | Kanbara ..................... 359/557 |
| 5,912,525 A | | 6/1999 | Kobayashi et al. |
| 5,917,267 A | | 6/1999 | Miyazawa et al. |
| 6,111,336 A | | 8/2000 | Yoshida et al. |
| 6,483,226 B1 | | 11/2002 | Okada |
| 6,528,926 B2 | | 3/2003 | Okamoto et al. |
| 6,907,850 B2 | * | 6/2005 | Creel ........................ 123/71 R |
| 7,144,932 B2 | * | 12/2006 | Hokkirigawa et al. ......... 524/15 |

(Continued)

FOREIGN PATENT DOCUMENTS

EP  1 708 352 A2  10/2006

(Continued)

OTHER PUBLICATIONS

Machine Translation of JP2005-218244A.*

(Continued)

*Primary Examiner*—Rodney E Fuller
*Assistant Examiner*—Linda B Smith
(74) *Attorney, Agent, or Firm*—Birch, Stewart, Kolasch & Birch, LLP

(57) ABSTRACT

A driving mechanism comprises: (i) an actuator comprising: an electro-mechanical conversion element; a driving member which is connected to one end of the electro-mechanical conversion element and moves in accordance with elongation or contraction of the electro-mechanical conversion element; and a weight member provided on the other end of the electro-mechanical conversion element; and (ii) a driven member frictionally engaged with the driving member, wherein the actuator allows the driven member to move along the driving member, and the weight member comprises a member which reduces a resonance frequency of the actuator.

25 Claims, 19 Drawing Sheets

U.S. PATENT DOCUMENTS

| | | | |
|---|---|---|---|
| 7,154,210 B2 * | 12/2006 | Hoshino | 310/317 |
| 7,219,550 B2 * | 5/2007 | Lau | 73/514.34 |
| 2001/0026112 A1 | 10/2001 | Yoshida et al. | |
| 2002/0075571 A1 | 6/2002 | Chikami et al. | |
| 2002/0084719 A1 | 7/2002 | Okamoto et al. | |
| 2003/0168940 A1 * | 9/2003 | Kurita et al. | 310/328 |

FOREIGN PATENT DOCUMENTS

| | | |
|---|---|---|
| JP | 3171022 B2 | 3/2001 |
| JP | 3171187 B2 | 3/2001 |
| JP | 2001-211669 A | 8/2001 |
| JP | 2002-142470 A | 5/2002 |
| WO | WO 2004064114 A2 * | 7/2004 |

OTHER PUBLICATIONS

Machine Translation of JP2002-116753A.*
Srivastava, V.K., "Mechanical properties of E-glass fibre reinforced nylon 6/6 resin composites", Jan. 9, 1991, Journal of Materials Science, 26, pp. 6693-6698.*

* cited by examiner

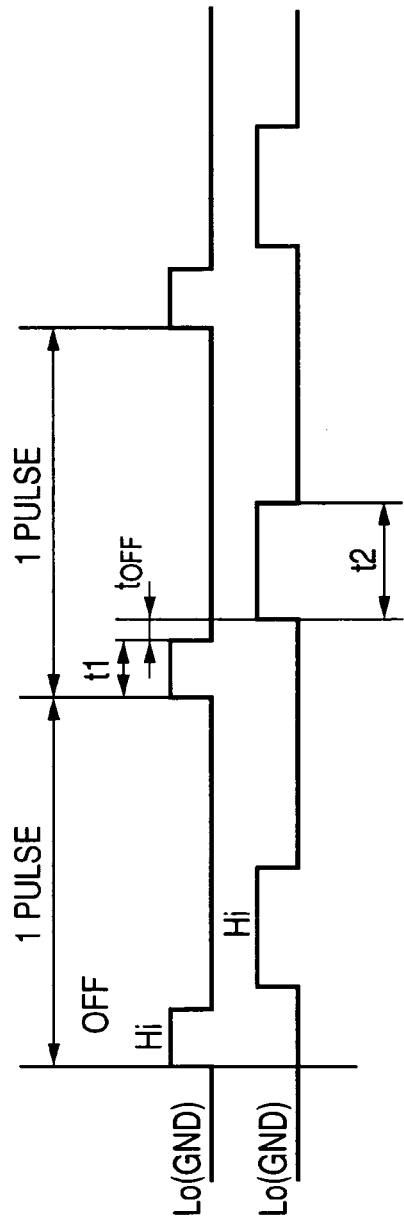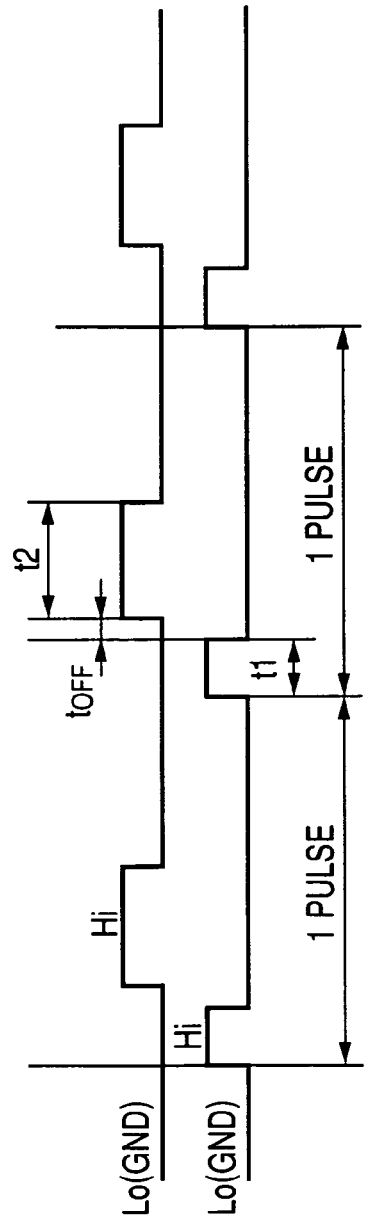

FIG. 26

|  | 1 | 2 | 4 | 5 | 6 |
|---|---|---|---|---|---|
| E(Pa) | 6.00E+07 | 3.00E+08 | 1.00E+09 | 1.2E+11 | 2E+11 |
| A(m$^2$) | 3.50E-06 | 3.50E-06 | 3.50E-06 | 3.50E-06 | 3.50E-06 |
| Ma(kg) | 8.00E-06 | 8.00E-06 | 8.00E-06 | 8.00E-06 | 8.00E-06 |
| Mb(kg) | 3.00E-05 | 3.00E-05 | 3.00E-05 | 3.00E-05 | 3.00E-05 |
| Mc(kg) | 2.08E-05 | 2.08E-05 | 2.08E-05 | 2.08E-05 | 2.08E-05 |
| h(m) | 5.00E-04 | 5.00E-04 | 5.00E-04 | 5.00E-04 | 5.00E-04 |
| f$_0$(kHz) | 1.54E+01 | 3.44E+01 | 6.28E+01 | 6.88E+02 | 8.88E+02 |

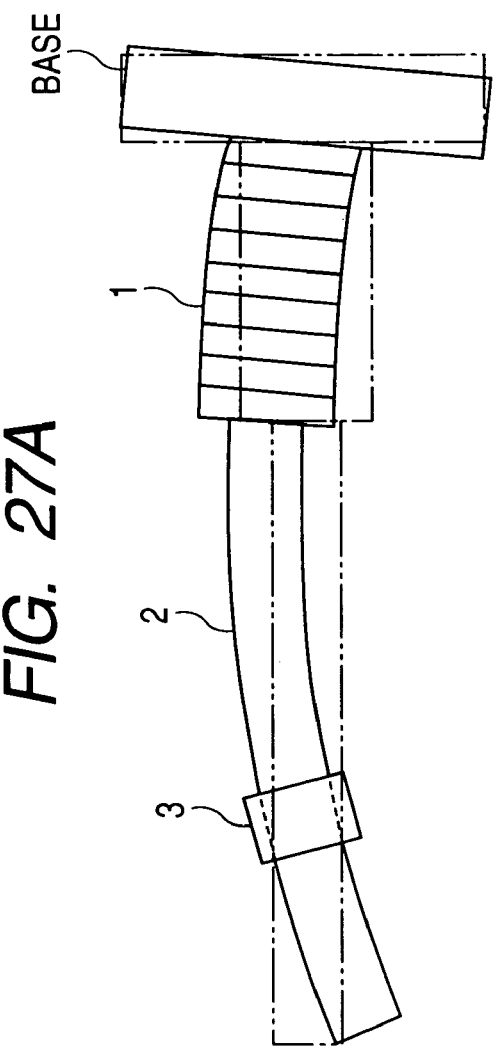
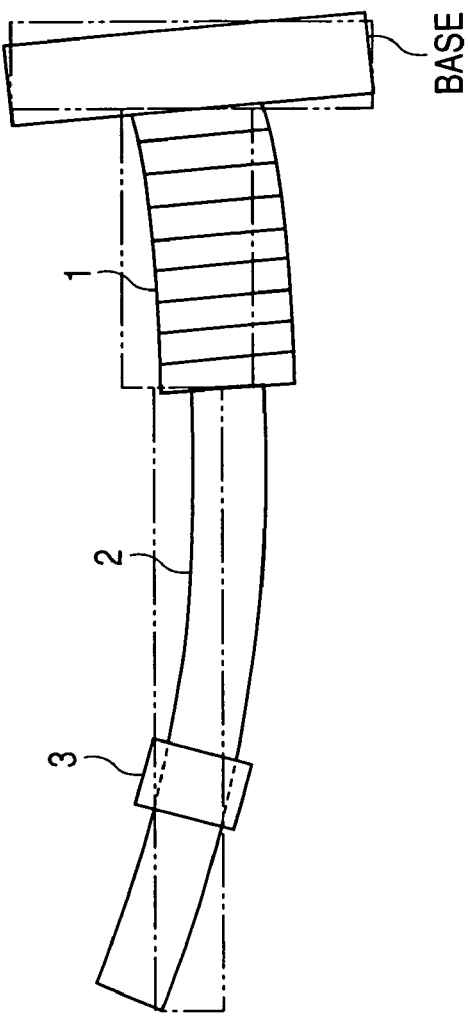
FIG. 27A
FIG. 27B

DRIVING MECHANISM, PHOTOGRAPHIC MECHANISM AND CELLULAR PHONE

BACKGROUND OF THE INVENTION

1. Field of the Invention

The present invention relates to a driving mechanism, a photographic mechanism in which an optical member is connected to the driving mechanism such as a small digital camera and a web camera and a cellular phone equipped with the driving mechanism and the photographic mechanism.

2. Description of the Related Art

An actuator in which an electro-mechanical conversion element such as a piezoelectric element is used is known as a driving mechanism for a lens used in digital cameras and the like. For example, as shown in the embodiments of Japanese Patent No. 3171187 or Japanese Patent No. 3171022, the actuator is, in general, constituted by an electro-mechanical conversion element and a driving member and fixed to a cabinet (or support member) on one end surface of the electro-mechanical conversion element in the elongation and contraction direction. A driving member is fastened to the other end surface of the electro-mechanical conversion element in the elongation and contraction direction, and a driven member is frictionally engaged with the driving member. The above-described constitution makes it possible to transmit a movement in the elongating and contracting direction of the electro-mechanical conversion element to the driving member when a pulse-form voltage is applied to the electro-mechanical conversion element. Where the electro-mechanical conversion element is deformed slowly, the driven member moves together with the driving member. Where the electro-mechanical conversion element is quickly deformed, the driven member remains at the same position due to inertia of the mass. Therefore, the driven member is allowed to move intermittently at a fine pitch by a repeated application of the pulse-form voltage which is different in reciprocating movement.

Since the thus constituted actuator is fixed to a cabinet (or a support member) at one end surface of an electro-mechanical conversion element in the elongation and contraction direction, in association with vibration of the electro-mechanical conversion element, vibration generated on an actuator including a driving member is directly transmitted to the cabinet, thereby causing a problem that vibration has developed between the actuator and the cabinet.

JP-A-2002-142470 has disclosed a mechanism in which a base is provided between an electro-mechanical conversion element and a cabinet, one end surface of the electro-mechanical conversion element in the elongation and contraction direction is fixed to the base, and the base is elastically supported to the cabinet, thereby reducing or blocking vibration transmitted between the base and the cabinet to avoid the effect of the resonance.

Further, Japanese Patent No. 3171187 has disclosed a mechanism in which a charging time of applying voltage to an electro-mechanical conversion element is made equivalent to about one cycle of resonance frequency of the electro-mechanical conversion element and a discharging time is made equivalent to ½ cycle, namely, resonance is actively used, thereby increasing an elongation and contraction extent of the electro-mechanical conversion element to improve the driving efficiency of an actuator.

In addition, Japanese Patent No. 3171022 has disclosed a method for driving an actuator, with the effect of resonance taken into account, in which the driving frequency of the actuator f is expressed by $f_1/3 \leq f \leq 2f_1/3$ where a driving member is fixed to one end of an electro-mechanical conversion element which is kept free and the other end is used as a fixed end to give the resonance frequency as $f_1$.

The mechanism disclosed in JP-A-2002-142470 is to avoid at least the effect of the resonance. Therefore, the conditions are established for resonance frequency of an actuator and driving frequency of an electro-mechanical conversion element, with such a fact taken into account that an adverse effect of resonance may develop, if a base is not elastically fixed to a cabinet in the mechanism. Further, since the mechanism disclosed in Japanese Patent No. 3171187 is to make an active utilization of resonance, in any case there is a problem that an adverse effect by resonance inside an actuator results in displacement of a driving member in a direction other than the elongating and contracting direction of a piezoelectric element. For example, as shown in FIG. 27A and FIG. 27B, such a problem is posed that a driving member 2 is influenced by the resonance to displace in a direction other than the elongating and contracting direction of the piezoelectric element. Therefore, the driving force by the elongation and contraction of the piezoelectric element 1 is not accurately transmitted to a driven member 3, thereby making it difficult to accurately move the driven member 3 in the elongating and contracting direction of the piezoelectric element 1.

Further, in the mechanism disclosed in Japanese Patent No. 3171022 where it is desirable that a constitution system including a cabinet has a resonance frequency higher than a driving frequency, components such as a piezoelectric element and a driving member are made more rigid or individual members are bound more strongly to increase the resonance frequency. It is indispensable to make more rigid all the components including the cabinet, which results in a problem that a higher cost is needed in manufacturing the mechanism. There is another problem that according to the conditional expression disclosed in the above Document, since the driving frequency can be established only in a relatively narrow range (in the range shown in Q of FIG. 6B), the resonance frequency is decreased to be deviated from the condition and adversely influenced by resonance, when the mechanism has defects or varies in quality.

SUMMARY OF THE INVENTION

The present invention has been made in view of the above problems and an object thereof is to provide a driving mechanism, a photographic mechanism and a cellular phone capable of driving and controlling a driven member accurately and stably.

In order to provide the above-described object, according to the first aspect of the invention, there is provided a driving mechanism comprising: (i) an actuator comprising: an electro-mechanical conversion element; a driving member which is connected to one end of the electro-mechanical conversion element and moves in accordance with elongation or contraction of the electro-mechanical conversion element; and a weight member provided on the other end of the electro-mechanical conversion element; and (ii) a driven member frictionally engaged with the driving member, wherein the actuator allows the driven member to move along the driving member, and the weight member comprises a member (hereinafter, referred to as "resonance frequency-reducing member") which reduces a resonance frequency of the actuator.

According to a first aspect of the invention, since a driving member provided on one end of an electro-mechanical conversion element and a weight member provided on the other end thereof act to reduce the resonance frequency of an actuator itself which is constituted by the electro-mechanical conversion element, the driving member and the weight member, the invention is influenced to a lesser extent by a constitutional variation in components of the actuator such as the electro-mechanical conversion element, the driving member and the weight member. Therefore, less influence is given by resonance, regardless of in which way the actuator is attached to the cabinet, making it possible to obtain a stable driving force. Thereby, a driving force by elongation and contraction of the electro-mechanical conversion element is accurately transmitted to a driven member, and the driven member is allowed to move accurately and stably to the elongating and contracting direction of the electro-mechanical conversion element.

According to a second aspect of the invention, there is provided a driving mechanism as set forth in the first aspect of the invention, wherein a material of the weight member is smaller in Young's modulus than a material of the electro-mechanical conversion element.

According to a third aspect of the invention, there is provided a driving mechanism as set forth in the first or the second aspect of the invention, wherein a material of the weight member is 1 GPa or lower in Young's modulus.

When Young's modulus of the weight member is established as described above, it is possible to reduce the resonance frequency of an actuator to a great extent and also to prevent the occurrence of resonance in a range of driving frequency. Young's modulus of the weight member is preferably 1 GPa or lower and more preferably 300 MPa or lower.

According to a fourth aspect of the invention, there is provided a driving mechanism as set forth in any of the first to third aspects of the invention, wherein a value obtained by dividing a specific gravity of the weight member by Young's modulus of the weight member is $1.8 \times 10^{-9}$ or greater.

According to a fifth aspect of the invention, there is provided a driving mechanism as set forth in any of the first to fourth aspects of the invention, wherein the weight member comprises a soft material, an elastic body or a viscoelastic material.

According to a sixth aspect of the invention, there is provided a driving mechanism as set forth in any of the first to fifth aspects of the invention, wherein the weight member comprises a soft material, an elastic body or a viscoelastic material, so as to reduce resonance frequency of the actuator to a greater extent than a case where a weight member constituted by a rigid material is provided.

According to a seventh aspect of the invention, there is provided a driving mechanism as set forth in any of the first to sixth aspects of the invention, wherein the weight member is an elastic body containing metal powder.

According to an eighth aspect of the invention, there is provided a driving mechanism as set forth in the seventh aspect of the invention, wherein the elastic body is resin.

In this instance, where the weight member is constituted by a resin in which metal powder is contained, as described above, there is a risk that the metal powder is oxidized to cure the resin by the resulting oxidization, thereby causing the hardness and the specific gravity of the weight member to change and failing in providing a desired function as the weight member.

Therefore, according to a ninth aspect of the invention, there is provided a driving mechanism as set forth in the eighth aspect of the invention, wherein the weight member is coated with a film for suppressing oxidation of the metal powder contained on the weight member. When the weight member is coated with a film for suppressing oxidation of the metal powder contained in the weight member, oxidation of the metal powder is suppressed to prevent curing of the resin. As a result, the weight member exhibits a desired function.

Further, according to a tenth aspect of the invention, there is provided a driving mechanism as set forth in the ninth aspect of the invention, wherein the film further acts as an adhesive agent for fixing the weight member to the electro-mechanical conversion element. When the weight member is coated with an adhesive agent as described above, oxidation of metal powder is suppressed. In addition, when the weight member is coated with an adhesive agent, the adhesive agent can also be used as an adhesive agent for fixing the weight member to the electro-mechanical conversion element. In this instance, the adhesive agent is preferably a thermosetting adhesive agent. When the weight member coated with the thermosetting adhesive agent is placed on the electro-mechanical conversion element and heat is applied thereto, the weight member is favorably attached to the electro-mechanical conversion element by the thermosetting adhesive agent.

Further, according to an eleventh aspect of the invention, there is provided a driving mechanism as set forth in the eighth aspect of the invention, wherein the metal powder is previously treated by anti-oxidation coating. Previous anti-oxidation coating of the metal powder is able to prevent the oxidation of the metal powder and also the curing of the resin. As a result, the weight member exhibits a desired function.

According to a twelfth aspect of the invention, there is provided a driving mechanism as set forth in the eighth aspect of the invention, wherein metal powder is previously oxidized at least on its outer surface. Since the metal powder is oxidized previously at least on the surface, no oxidation will take place and curing of the resin is prevented. As a result, the weight member exhibits a desired function.

According to a thirteenth aspect of the invention, there is provided a driving mechanism as set forth in the eighth aspect of the invention, wherein the resin prevents oxidation of the metal powder. Use of the resin which prevents oxidation of the metal powder is able to prevent the oxidation of the metal powder and also the curing of the resin. As a result, the weight member exhibits a desired function.

According to a fourteenth aspect of the invention, there is provided a driving mechanism as set forth in any of the first, fifth and sixth aspects of the invention, wherein the weight member comprises a metal and a viscoelastic material.

According to a fifteenth aspect of the invention, there is provided a driving mechanism as set forth in any of the first to eighth and fourteenth aspects of the invention, wherein a viscoelastic material, a soft material or an elastic material is provided between the electro-mechanical conversion element and the weight member.

According to a sixteenth aspect of the invention, there is provided a driving mechanism as set forth in any of the first to fifteenth aspects of the invention, wherein the driving member is supported on at least one of its leading end side and its base end side, so as to move in elongating and contracting directions of the electro-mechanical conversion element.

According to a seventeenth aspect of the invention, there is provided a driving mechanism as set forth in any of the first to sixteenth aspects of the invention, further comprising a cabinet, wherein the actuator is supported laterally to the cabinet in the elongating and contracting directions of the electro-mechanical conversion element.

According to an eighteenth aspect of the invention, there is provided a driving mechanism as set forth in any of the first to seventeenth aspects of the invention, further comprising a driving section that generates asymmetric signals in the elongating and contracting directions so as to drive the electro-mechanical conversion element.

According to a nineteenth aspect of the invention, there is provided a driving mechanism as set forth in any of the first to eighteenth aspects of the invention, wherein the driven member is in surface contact with the driving member.

According to a twentieth aspect of the invention, there is provided a driving mechanism as set forth in any of the first to nineteenth aspects of the invention, further comprising a detecting section that detects a movement position of the driven member.

According to a twenty-first aspect of the invention, there is provided a driving mechanism as set forth in any of the first to twentieth aspects of the invention, wherein the electro-mechanical conversion element is driven at a driving frequency exceeding an audible frequency. In this instance, a driving sound in the audible frequency region of the electro-mechanical conversion element can be reduced.

According to a twenty-second aspect of the invention, there is provided a photographic mechanism comprising: the driving mechanism as set forth in any of the first to twenty-first aspects of the invention; and an optical member connected to the driven member of the driving mechanism. In this instance, the optical member is not restricted only to a lens, and the driven member is also used in diaphragms, shutters, ND filters and the like. Further, the photographic mechanism may be used as a relatively-small sized photographic mechanism such as a web camera and a small-sized digital camera.

According to a twenty-third aspect of the invention, there is provided a cellular phone comprising the driving mechanism as set forth in any of the first to twenty-first aspects of the invention or the photographic mechanism as set forth in the twenty-second aspect of the invention

BRIEF DESCRIPTION OF THE DRAWINGS

FIGS. 14A and 14B are wave pattern views of input signals to be inputted to the driving circuit of FIG. 13;

FIG. 26 is a view showing a calculation example of the resonance frequency; and

FIGS. 27A and 27B are views explaining defects found in the related-art actuator.

DETAILED DESCRIPTION OF THE INVENTION

Hereinafter, a detailed explanation will be made for preferred embodiments of the driving mechanism, photographic mechanism and cellular phone in the present invention with reference to the attached drawings. In explaining the drawings, the same element is given the same symbol to omit an overlapping explanation.

Figure 1:
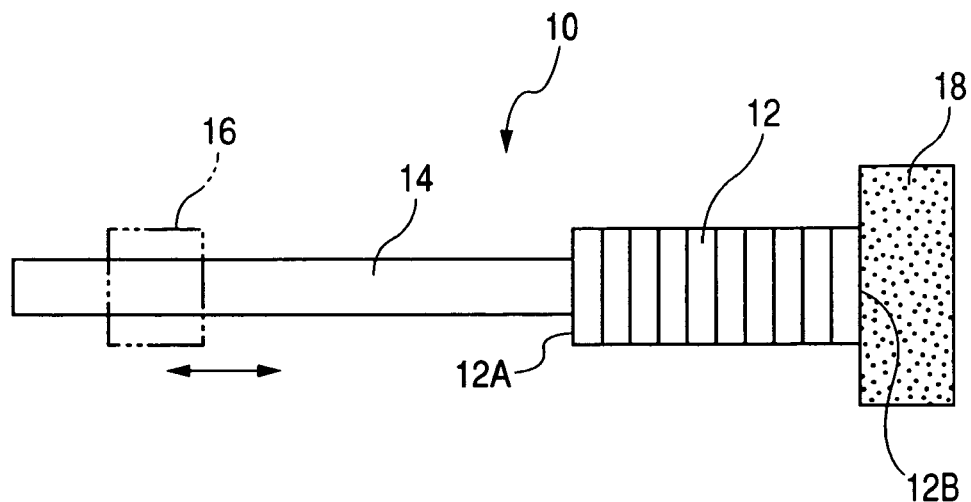
FIG. 1 is a plan view showing an actuator of a driving mechanism of a first embodiment in the present invention.

FIG. 1 is a plan view showing an actuator 10 of a driving mechanism 100 of a first embodiment in the present invention. As shown in FIG. 1, the actuator 10 is constituted by a piezoelectric element (corresponding to an electro-mechanical conversion element) 12, a driving member 14 and a weight member 18. The piezoelectric element 12 is laminated in the direction shown by the arrow and constituted so as to deform in a laminated direction (elongation and contraction) on application of voltage. Therefore, the piezoelectric element 12 is designed so that longer end surfaces 12A and 12B are displaced.

Of the end surfaces 12A and 12B of the piezoelectric element 12, to one end surface 12A is fastened a base end of the driving member 14. The driving member 14 is formed, for example, in a cylindrical shape, and its axis is arranged in the direction shown by the arrow (namely, in the elongating and contracting direction of the piezoelectric element). The driving member 14 is preferably made with a light and rigid material. Beryllium is an ideal and eligible substance for this purpose. However, it is a rare metal and disadvantageous in that it is high in price and poor in workability. Then, in the present embodiment, a graphite composite in which graphite crystals are rigidly complicated, for example, carbon graphite, is used (in this instance, the graphite composite means a composite of graphite, as a hexagonal plate crystal of carbon, with substances other than graphite, the carbon graphite means a substance composed of graphite and amorphous carbon, and graphite is also called black lead). Carbon graphite as the graphite composite is advantageous in that it is similar to beryllium in characteristics (specific gravity of beryllium is about 1.85 and that of carbon graphite is about 1.8) but relatively inexpensive and better in workability unlike beryllium. Therefore, the actuator 10 can be reduced in cost. The driving member 14 is not restricted in configuration to a cylindrical shape but may be available in a rectangular shape.

A driven member 16 is engaged with a driving member 14 at a predetermined friction and supported so as to slide along the driving member 14. Friction between the driven member 16 and the driving member 14 is provided in such a way that, on application of a gradually changing voltage to a piezoelectric element 12, the static friction is greater than the driving force and, on application of an abruptly changing voltage to the piezoelectric element 12, the static friction is smaller than the driving force. It is noted that a lubricant is applied to an area where the driving member 14 slides to be in contact with the driven member 16, thereby making the movement stable and also improving the durability on a repeated driving. It is preferable that the lubricant is not affected for the performance by temperatures so as not to increase a sliding and driving resistance of the driving member 14 with the driven member 16. It is also preferable that the lubricant will not produce dust and the like which may affect optical components or mechanical components.

A weight member 18 is fastened to an end surface 12B of a piezoelectric element 12. The weight member 18 gives a load to the end surface 12B of the piezoelectric element 12, thereby preventing the end surface 12B from undergoing a greater displacement than the end surface 12A. The weight member 18 is preferably heavier than a driving member 14. Further, the weight member 18 whose mass is greater than that of the driving member 14 is provided, thereby making it possible to effectively transmit the elongation and contraction of the piezoelectric element 12 to the driving member 14. For example, where the driving member 14 is 8 mg and the piezoelectric element 12 is 30 mg, the weight member 18 of 20 mg is used.

Further, the weight member 18 is made with a soft material. The weight member 18 is made with a material whose Young's modulus is smaller than that of the piezoelectric element 12 and that of the driving member 14. The Young's modulus of the weight member 18 is preferably 1 GPa or lower, and more preferably 300 MPa or lower. The above-described weight member 18 is made by mixing an elastic body such as rubber with metal powder having a greater specific gravity. It is manufactured, for example, by mixing urethane rubber and urethane resin with tungsten powders. The specific gravity of the weight member 18 is preferably as high as possible for miniaturizing a mechanism, and established to be from 8 to 12, for example. Further, the weight member 18 prepared by mixing urethane rubber or urethane resin with tungsten powders is about 60 MPa in Young's modulus and about 11.7 in specific gravity. Therefore, where the weight member 18 is designed to be as small as possible in volume, optimal substances to be used together are those having the specific gravity as great as possible and the Young's modulus as small as possible. Any substance is usable as the weight member 18, as long as it is greater in specific gravity than the driving member 14 (the specific gravity of 1.8 or greater) and 1 GPa or lower in Young's modulus. More specifically, if a substance has a value obtained by dividing the specific gravity by Young's modulus (specific gravity/Young's modulus) of $1.8 \times 10^{-9}$ or greater, it is suitable as the weight member 18.

Figure 2A:
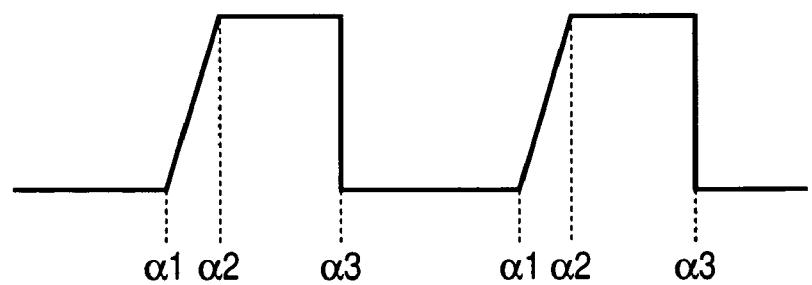
FIGS. 2A and 2B are wave pattern views showing a driving pulse applied to a piezoelectric element.
Figure 2B:
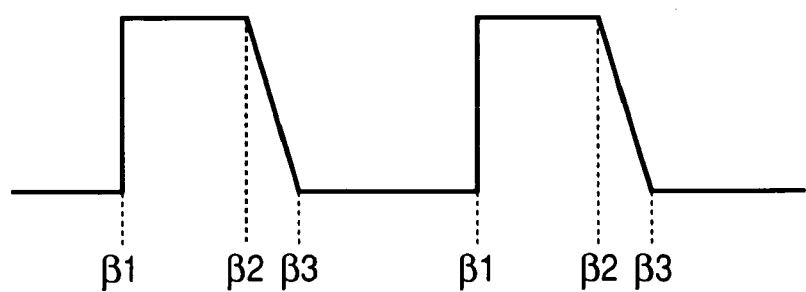

A driving-pulse supplying device (driving section) 26 (refer to FIG. 4) is electrically connected to the piezoelectric element 12. Voltage, the wave pattern of which is shown in FIG. 2A and FIG. 2B is applied by the driving-pulse supplying device. A signal, the frequency of which exceeds an audible frequency, is used as an output signal of FIGS. 2A and 2B, namely, an electric signal for driving the piezoelectric element 12. The signal with the above-described frequency is used to reduce a driving sound in the audible frequency region of the piezoelectric-element 12. It is noted that the signal with the frequency exceeding the audible frequency is also used in the embodiments to be described later.

FIG. 2A and FIG. 2B show one example of a pulse wave pattern applied to the piezoelectric element 12. FIG. 2A shows a pulse wave pattern found when the driven member 16 of FIG. 1 is moved to the left as given by the arrow, and FIG. 2B shows a pulse wave pattern found when the driven member 16 of FIG. 1 is moved to the right as given by the arrow.

As shown in FIG. 2A, an approximately serrate driving pulse which rises gradually from a time $\alpha 1$ to a time $\alpha 2$ and falls abruptly at a time $\alpha 3$ is applied to a piezoelectric element 12. Therefore, from the $\alpha 1$ to the time $\alpha 2$, the piezoelectric element 12 is gradually elongated. In this instance, since a driving member 14 moves slowly, a driven member 16 moves together with the driving member 14. Thereby, the driven member 16 is allowed to move to the left as shown in FIG. 1. Since the piezoelectric element 12 is abruptly contracted at the time $\alpha 3$, the driving member 14 moves to the right as shown in FIG. 1. In this instance, an abrupt movement of the driving member 14 allows the driving member 14 alone to move, while the driven member 16 is kept halted at the position concerned due to inertia. Since the driven member 16 given in FIG. 1 repeats the movement and the halt to the left by a repeated application of the serrate driving pulse shown in FIG. 2A, it is allowed to move to the left.

Figure 13:
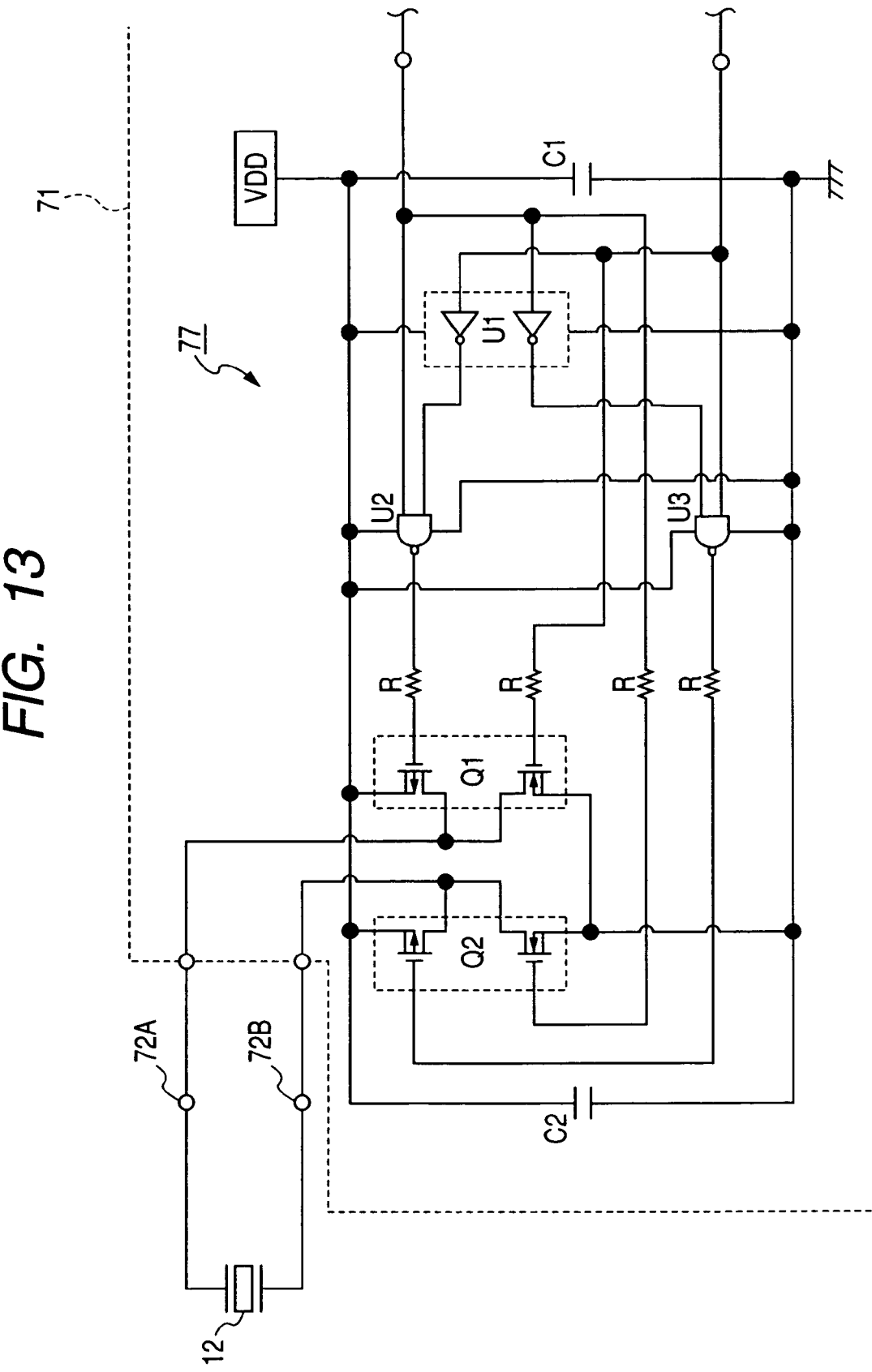
FIG. 13 is a circuit diagram showing a driving circuit of an actuator in FIG. 11.

As shown in FIG. 2B, an approximately serrate driving pulse which rises abruptly at a time $\beta 1$ and falls gradually from a time $\beta 2$ to a time $\beta 3$ is applied to a piezoelectric element 12. Therefore, at the time $\beta 1$ the piezoelectric element 12 is abruptly elongated, and the driving member 14 moves to the left as shown in FIG. 1. In this instance, an abrupt movement of the driving member 14 allows the driving member 14 alone to move, while the driven member 16 is kept halted at the position concerned due to inertia. At the time $\beta 2$ to the time $\beta 3$, the piezoelectric element 12 is gradually contracted. At this moment, since the driving member 14 is gradually displaced, the driven member 16 moves together with the driving member 14. Thereby, the driven member 16 is allowed to move to the right as shown in FIG. 1. Since the driven member 16 of FIG. 1 repeats the movement and the halt to the right by a repeated application of the serrate driving pulse shown in FIG. 2B, it is allowed to move to the right. It is noted that the above-described serrate driving pulse is used as an example for explanation, and actually, a circuit as shown in FIG. 13 is used to input and output signals shown in FIGS. 14A and 14B and FIGS. 15A and 15B. The output signal is equivalent to the serrate driving pulse. Further, it is preferable to use a driving frequency in the range from 20 to 200 kHz, if selection is made to consider that an audible frequency region where the driving frequency is recognized as abnormal noise is avoided and that an electric consumption is small. It is more preferable to use the driving frequency in the range from 50 to 100 kHz.

Next, an explanation will be made for the thus constituted actuator 10.

In an actuator 10, a weight member 18 bonded to the end surface 12B of a piezoelectric element 12 is made of a flexible material whose Young's modulus is small. This type of the weight member 18 is used to drastically reduce the resonance frequency $f_0$ of an equivalent-1 free system in which the piezoelectric element 12 and a driving member 14 are given as a mass and the weight member 18 is given as an elastic body. In other words, the weight member 18 functions as a resonance frequency-reducing member for reducing the resonance frequency. Further, the actuator 10 is lower in resonance frequency than a case where the weight member 18 made of a flexible material having a small Young's modulus is used to provide a weight member made of a rigid material. This fact is apparent from the formula given below for measuring the resonance frequency $f_0$. In the formula (1), E denotes Young's modulus of the weight member 18; A, area on the side of the piezoelectric element 12 of the weight member 18; h, thickness of the weight member 18; Ma, mass of the piezoelectric element 12; Mb, mass of the driving member 14, and Mc, mass of the weight member 18.

$$f_0 = \frac{1}{2\pi}\sqrt{\frac{EA}{\left(Ma + Mb + \frac{1}{3}Mc\right)h}} \quad \text{[Formula 1]}$$

As apparent from the formula, when the Young's modulus E of the weight member 18 is made small, the resonance frequency $f_0$ in an equivalent-1 freedom system is also made small. In the present embodiment, the Young's modulus of the weight member 18 is made to be 1 Gpa or lower, thereby making it possible to reduce the resonance frequency $f_0$ to about 70 kHz or lower. Further, in the present embodiment, when the Young's modulus of the weight member 18 is made to be 300 Mpa or lower, the resonance frequency $f_0$ is made to be 35 kHz or lower as shown in FIG. 26. In addition, in the present embodiment, where the weight member 18 is used which is prepared by mixing tungsten powders with urethane rubber whose Young's modulus is about 60 Mpa, the resonance frequency $f_0$ is about 15 kHz. (Refer to the number 1 in FIG. 26. E+07 means×$10^7$.)

In contrast, where a member corresponding to the weight is made of a rigid material having a greater Young's modulus, the resonance frequency $f_0$ is made greater. For example, in the present embodiment, where a material of the weight member 18 is stainless steel whose Young's modulus is in a range of 200 to 400 Gpa, the resonance frequency $f_0$ is 1 GHz or greater. Further, even where aluminum whose Young's modulus is relatively small among metals (Young's modulus is approximately 120 GPa), the resonance frequency $f_0$ is approximately 700 kHz. (Refer to the number 5 in FIG. 26.)

As described previously, in the actuator 10 of the present embodiment, since a weight member 18 is formed by a resonance frequency-reducing member, it is possible to drastically reduce the resonance frequency $f_0$ of the equivalent-1 free system. Further, where the weight member 18 is made of an elastic body or viscoelastic material, a similar effect can be obtained (to be described later in detail).

In general, in order to prevent the transmission of vibration from vibrating machinery or buildings to the supporting foundation or the floor, it is better that they are smaller in vibration transmissibility. In the equivalent-1 free system, the vibration transmissibility is expressed by the following formula (2).

$$\lambda = \sqrt{\frac{1+\left(2\varsigma\frac{f}{f_0}\right)^2}{\left(1+\left(\frac{f}{f_0}\right)^2\right)^2+\left(2\varsigma\frac{f}{f_0}\right)^2}} \quad \text{[Formula 2]}$$

Figure 6A:
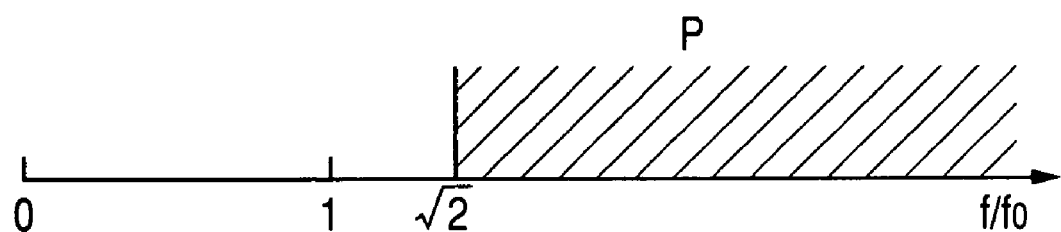
FIGS. 6A and 6B are views explaining the driving frequency region in relation to the resonance frequency.
Figure 6B:

The following symbols mean the following:
λ: vibration transmissibility of equivalent-1 freedom system
f: driving frequency to be used
$f_0$: resonance frequency of equivalent-1 freedom system
ζ: attenuation ratio of equivalent-1 freedom system In the equivalent-1 freedom system, the vibration transmissibility λ of which is in the range of 1 or lower, less mechanical vibration is transmitted to the foundation or floor irrespective of the value ζ. Therefore, as shown in the following formula (3) and the formula (4), which is a modification of the formula (3), when the vibration transmissibility λ is within the range of 1 or lower or within a range satisfying $f \geq 2^{1/2} \cdot f_0$ (range P in FIG. 6A), less vibration of the piezoelectric element 12 is transmitted to a support member of the actuator 10 (for example, body 20 in FIG. 4). This range is a vibration-isolating range where the effect of the resonance is quite small. Therefore, a combination of frequencies, which is an optimal embodiment of executing the invention, namely, the resonance frequency of the actuator is 70 k Hz or lower and the driving frequency is in the range from 50 to 100 k Hz, is able to satisfy the vibration-isolating range. The vibration-isolating range is described, for example, in "Introduction of Mode Analysis" authored by Akio Nagamatsu, published by Corona Corporation. Obviously, the relationship of $f \geq 2^{1/2} \cdot f_0$ is applicable to other embodiments.

$$1 \geq \lambda = \sqrt{\frac{1+\left(2\varsigma\frac{f}{f_0}\right)^2}{\left(1+\left(\frac{f}{f_0}\right)^2\right)^2+\left(2\varsigma\frac{f}{f_0}\right)^2}} \quad \text{[Formula 3]}$$

$$f \geq 2^{1/2} \cdot f_0 \quad \text{[Formula 4]}$$

According to the present invention, the weight member 18 is constituted by the resonance frequency-reducing member, thereby making it possible to reduce the resonance frequency of the actuator in itself which is constituted by the piezoelectric element 12, the driving member 14 and the weight member 18. It is, therefore, possible to prevent the driving member 14 from being deviated by resonance to a direction other than the elongating and contracting direction of the piezoelectric element 12. The driving member 14 is displaced to the elongating and contracting direction of the piezoelectric element 12, thereby making it possible to transmit accurately and stably a driving force derived from the elongation and contraction of the piezoelectric element 12 to the driven member 16. It is, therefore, possible to drive and control accurately and stably the driven member 16 in the elongating and contracting direction of the piezoelectric element 12. It is noted that in the present embodiment, the driven member 16 is allowed to be accurately driven in the elongating and contracting direction of the piezoelectric element 12, whereas the driven member 16 is moved to a smaller extent for one time than a case where resonance is utilized to move the driven member. However, the piezoelectric element 12 is laminated at a greater number of times or the driving conditions are appropriately established, thereby making it possible to move the driven member 16 to an extent sufficient in practical uses.

Further, according to the present invention, the resonance frequency $f_0$ is lowered, thereby making it possible to establish the driving frequency f of the actuator 10 in such a wide range of $f \geq 2^{1/2} \cdot f_0$. Therefore, it is not necessary to change the establishment of the driving frequency f, even in a case where the resonance frequency $f_0$ is changed due to environmental factors such as change in temperatures and variation in products. It is not necessary either to change the establishment for every actuator 10.

Still further, in the present embodiment, a soft weight member 18 is used to lower the resonance frequency $f_0$ to a great extent, thereby satisfying the relationship of $f \geq 2^{1/2} \cdot f_0$ even when the driving frequency f is in a narrow range. It is, therefore, possible to use the driving frequency f at a relatively low frequency and to reduce the electric consumption, as compared with a case where it is used at a high frequency. More specifically, it is necessary to use the driving frequency f at a high frequency in order to satisfy the relationship of $f \geq 2^{1/2} \cdot f_0$, where a rigid weight member is used. In this case, such a problem is posed that the electric consumption is increased. However, in the present embodiment where the resonance frequency $f_0$ is lowered to a great extent, it is possible to use the driving frequency f at a low frequency and to reduce the electric consumption.

Figure 3A:
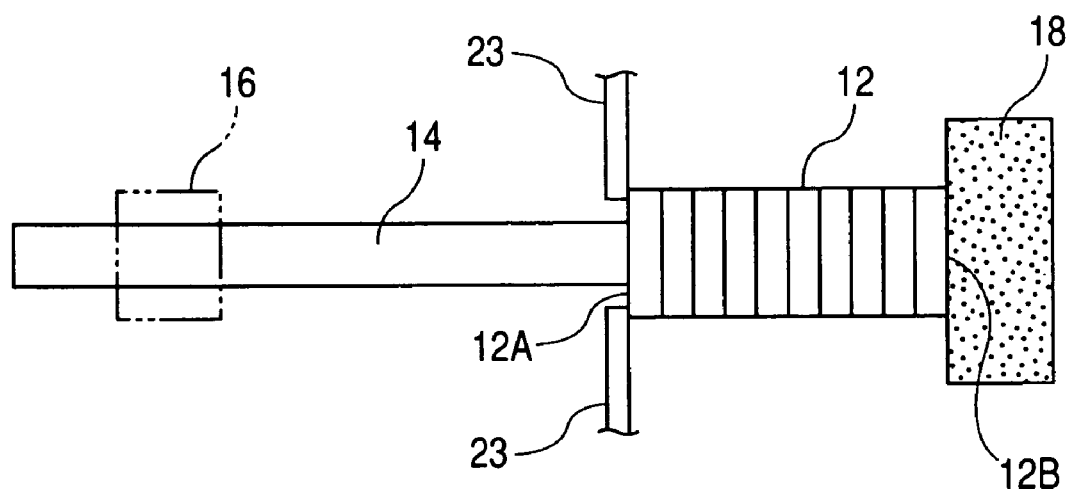
FIGS. 3A and 3B are pattern views showing a position of supporting the actuator given in FIG. 1.
Figure 3B:
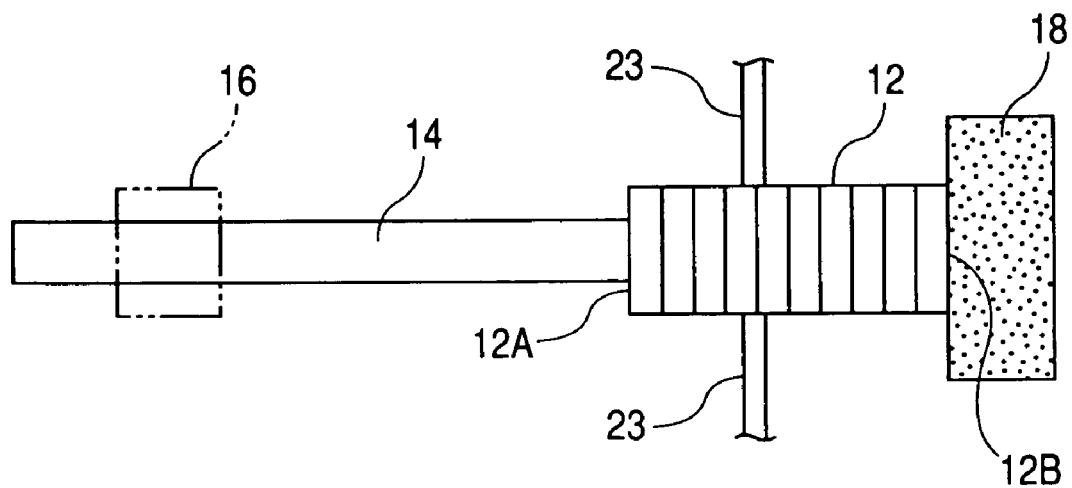

In addition, according to the present embodiment, an actuator constituted by a piezoelectric element 12, a driving member 14 and a weight member 18 is made small in resonance frequency $f_0$ in itself, thereby making it possible to remove the adverse effect of resonance. The actuator is less influenced by a constitutional variation in components and at the same time less influenced by resonance, irrespective of in which way the actuator is attached to a cabinet, thereby increasing the degree of freedom in terms of design and manufacture on attachment of the actuator. More specifically, as shown in FIG. 3A, the end surface 12A of the piezoelectric element 12 may be supported by a support member 23, or as shown in FIG. 3B, the side surface of the piezoelectric element 12 may be supported by the support member 23. Further, the driving member 14 may be supported on the leading end surface, the side surface, the leading end side and/or the base end side. Also, the weight member 18 may be supported on the side surface or the rear end surface.

Next, an explanation will be made for a driving mechanism 100 of a first embodiment in the present invention with reference to FIG. 4. The driving mechanism 100 is used in a camera-equipped cellular phone in which an actuator 10 of the present invention is loaded, and the actuator 10 is to move a zoom lens (not shown) such as a zoom lens and a focus lens.

Figure 4:
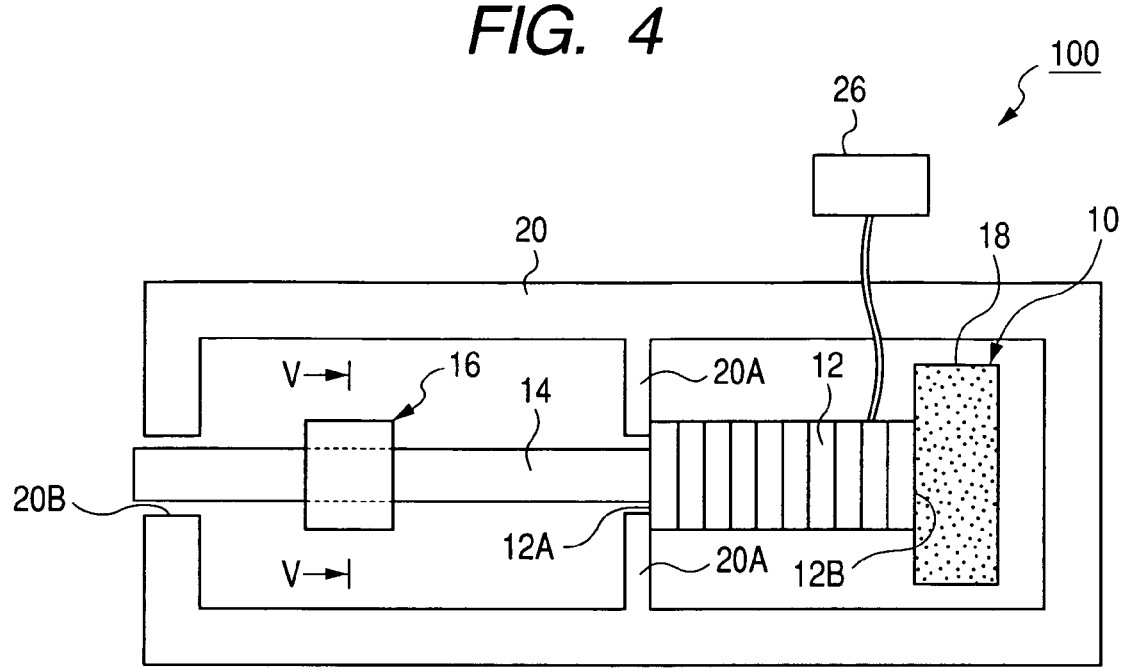
FIG. 4 is a plan view showing the driving mechanism of the first embodiment in the present invention.

The actuator 10 shown in FIG. 4 is supported by an end surface 12A of a piezoelectric element 12, as with the case shown in FIG. 3A. More specifically, the end surface 12A of the piezoelectric element 12 is adhered and fixed to a support portion 20A formed on a body (cabinet) 20.

A hole 20B is formed on the body 20. The hole 20B is formed to be slightly larger in outer diameter than that of a driving member 14, and the leading end of the driving member 14 is inserted through the hole 20B and supported.

Figure 5:
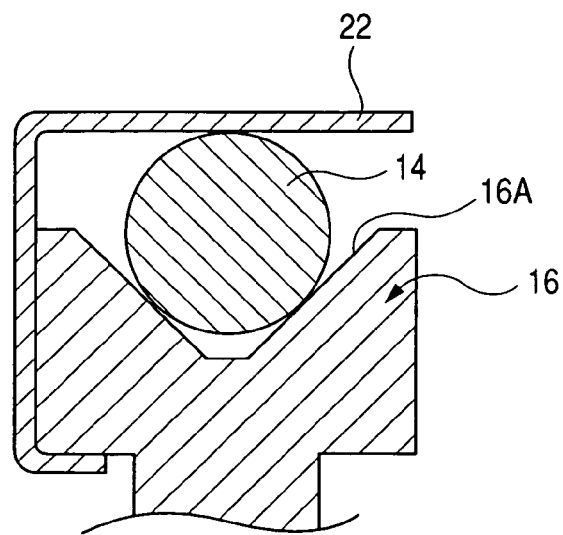
FIG. 5 is a sectional view taken along line V to V in FIG. 4.

As shown in FIG. 5, a driven member 16 is provided with a V-shaped groove 16A and a driving member 14 is engaged with the groove 16A. Further, a driven member 16 is provided with a blade spring 22 and the driving member 14 is urged to the driven member 16 by the blade spring 22. As described above, the driven member 16 is in line contact with the driving member 14 at three sites, and in practice it is in surface contact. Thereby, the driven member 16 is frictionally engaged with the driving member 14. Below the driven member 16 is connected a holding frame (not shown) for holding a zoom lens.

In the thus constituted driving mechanism 100, a weight member 18 is provided to prevent resonance, thereby making it possible to transmit a driving force of a piezoelectric element 12 to the elongating and contracting direction.

Next, an explanation will be made for a driving mechanism 200 of a second embodiment in the present invention with reference to FIG. 7 and FIG. 8. Explanation will be omitted here that has already been made in the first embodiment and will be made about the points which are different therefrom.

Figure 7:
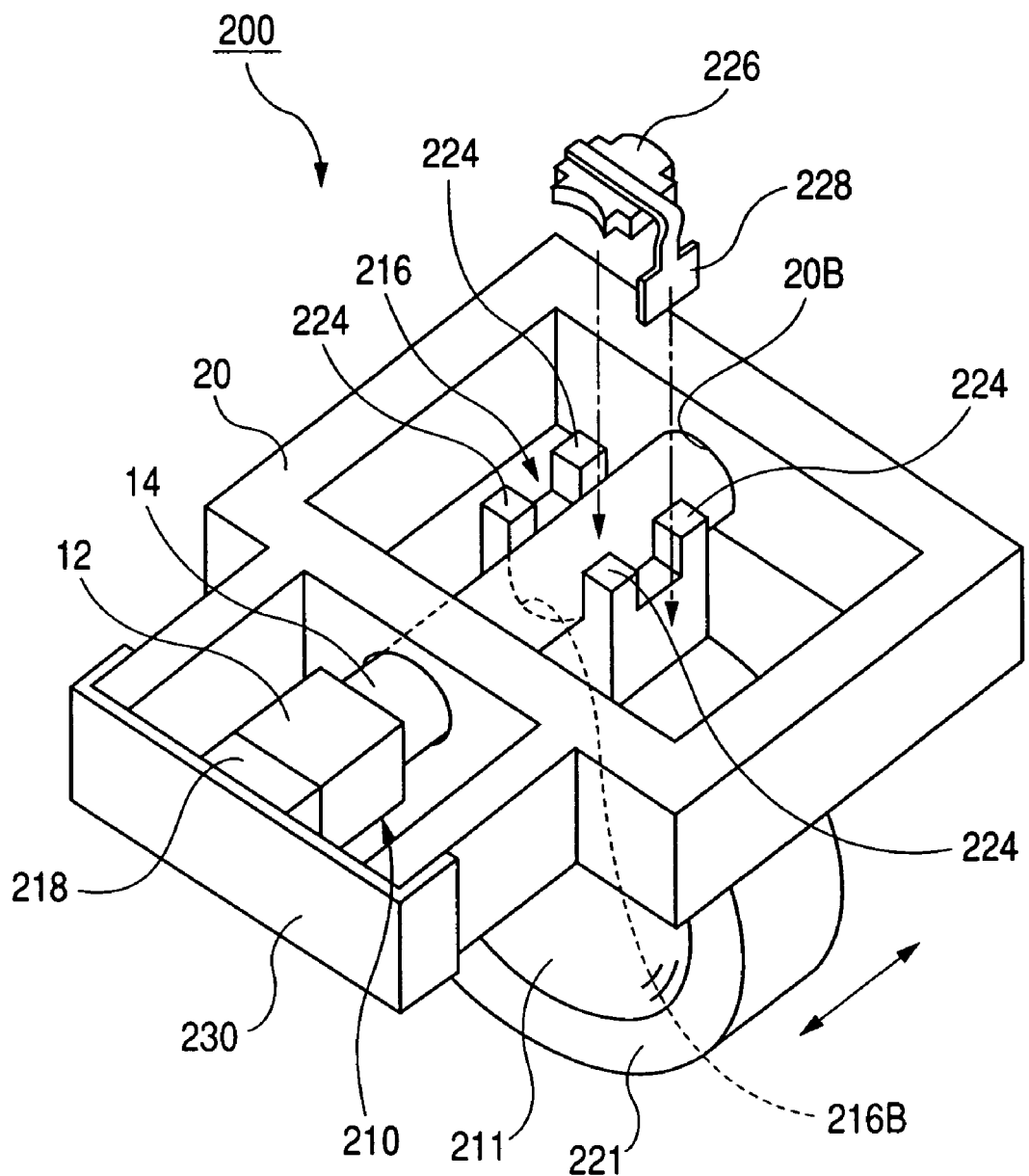
FIG. 7 is a perspective view showing a driving mechanism of a second embodiment in the present invention.
Figure 8:
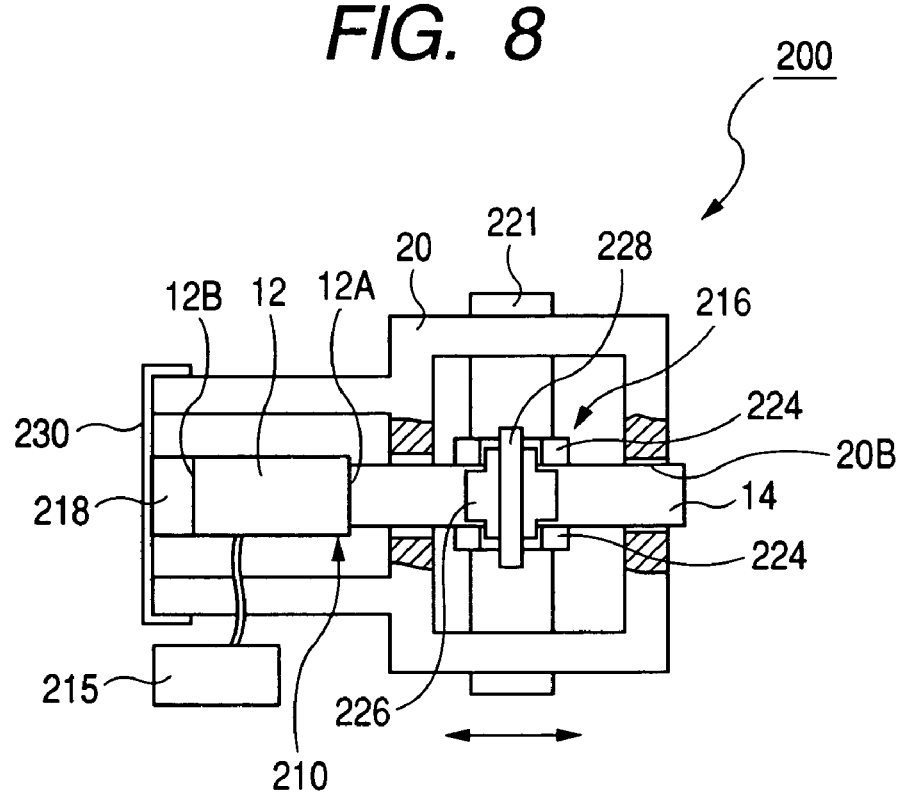
FIG. 8 is a plan view showing a driving mechanism in FIG. 7.

As shown in FIG. 7 and FIG. 8, in the driving mechanism 200, a driven member 216 is formed integrally with a lens frame 221 of a zoom lens 211. The lens frame 221 is guided by a guide bar (not shown) arranged in parallel with a driving member 14 to prevent rotation around the driving member 14. Further, a U-shaped groove 216B is formed in a driven member 216 and the driving member 14 is engaged with the groove 216B. Projections 224 and 224 . . . projecting upward are provided at each of the four corners of the driven member 216, and a friction plate 226 is provided at an area surrounded by the projections 224 and 224 . . . . The friction plate 226 is bent and formed in a circular shape in accordance with the side surface configuration of the driving member 14. Therefore, the driven member 216 is in surface contact with the driving member 14. Further, each corner of the friction plate 226 is notched in accordance with the projections 224 and 224 . . . of the driven member 216. Therefore, the friction plate 226 is arranged in an area surrounded by the projections 224 and 224 . . . to prevent removal of the friction plate 226.

A presser spring 228 is attached to the driven member 216. The presser spring 228 is constituted so as to urge the friction plate 226 to the driven member 216. Therefore, when the driving member 14 is arranged on the U-shaped groove 216B of the driven member 216 and the friction plate 226 is arranged thereon, the friction plate 226 is pressed to the driving member 14 by the presser spring 228, and the driving member 14 is held between the friction plate 226 and the driven member 216, thereby allowing the driven member 216 to be frictionally engaged with the driving member 14.

A soft weight member 218 is connected to the end surface 12B at the rear end of a piezoelectric element 12. The weight member 218 is preferably as high as possible in specific gravity, with miniaturization of the mechanism taken into account, and established to be, for example, in the same range with stainless steel (7.7 to 8.0). The weight member 218 is provided with a fitting 230 on a surface opposite a surface on which the piezoelectric element 12 is attached, and the weight member 218 is supported to a body 20 via the fitting 230. The fitting 230 is formed into a U shape by bending a metal plate, and the bent portions on both ends are fitted and fixed to the body 20. The piezoelectric element 12 is electrically connected to a driving pulse supplying device 215 (refer to FIG. 8), and the driving pulse supplying device 215 is used to apply a voltage to the piezoelectric element 12.

In the above-described embodiment, the end surface 12B at the rear end of the piezoelectric element 12 is supported by a soft weight member 218 in a state that it is practically kept free, thereby decreasing the resonance frequency $f_0$ to a range from 20 to 30 kHz. The driving frequency f from 50 to 100 kHz, which is usually used, is therefore to satisfy the relationship of $f \geq 2^{1/2} \cdot f_0$. A range which satisfies the relationship of $f \geq 2^{1/2} \cdot f_0$ is a vibration-isolating range where force is transmitted at a rate of 1 or lower and no great resonance will develop. Therefore, according to the present embodiment, the end surface 12B at the rear end of the piezoelectric element 12 is supported by the soft weight member 218 in a state which is practically kept free, thereby making it possible to prevent resonance derived from a driving frequency and also to secure constantly a stable driving capacity. Further, in the present embodiment, the weight member 218 is fixed to the body 20 via the fitting 230. However, the weight member 218 directly attached to the body 20 is also able to provide a similar effect.

Further, according to the present embodiment, the resonance frequency $f_0$ is decreased to establish the driving frequency f in a wider range of $f \geq 2^{1/2} \cdot f_0$, thereby making it possible to provide a stable driving which is free from effects such as environmental factors or variation in products.

Next, an explanation will be made for a driving mechanism 300 of a third embodiment in the present invention with reference to FIG. 9.

Figure 9:
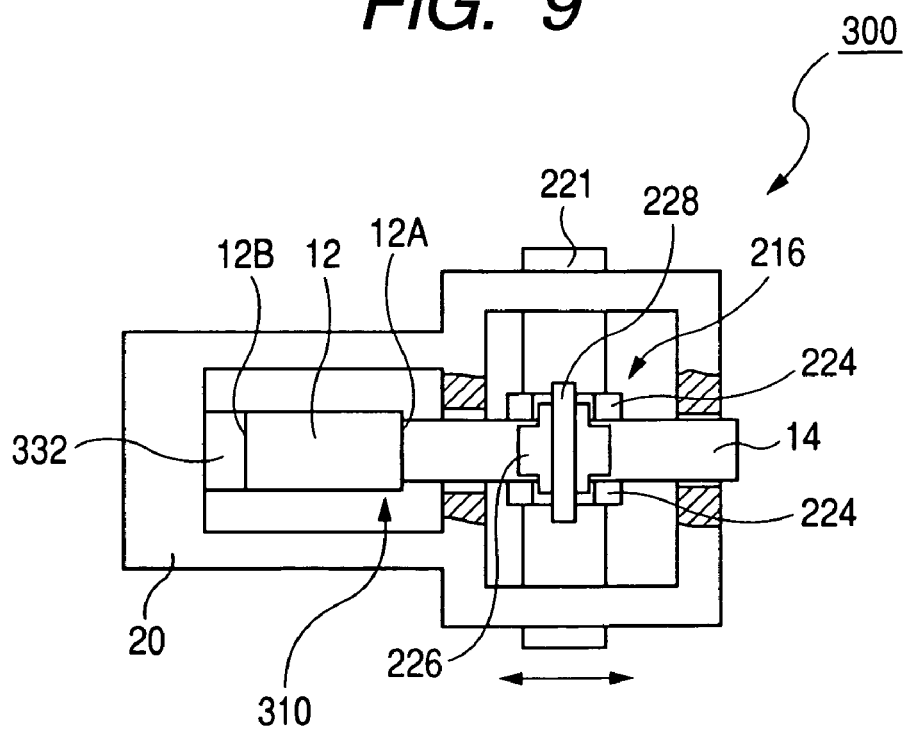
FIG. 9 is a plan view showing a driving mechanism of a third embodiment in the present invention.

As shown in FIG. 9, the driving mechanism 300 is different from the driving mechanism 200 in that a weight member 332 constituted by an elastic body such as rubber is adhered and fixed to the end surface 12B on the rear side of a piezoelectric element 12 and a surface opposite the piezoelectric element 12 in the weight member 332 is adhered and fixed to a body 20. The thus constituted mechanism is also able to provide effects and actions similar to those of the above embodiment.

Next, an explanation will be made for a driving mechanism 400 of a fourth embodiment in the present invention with reference to FIG. 10.

Figure 10:
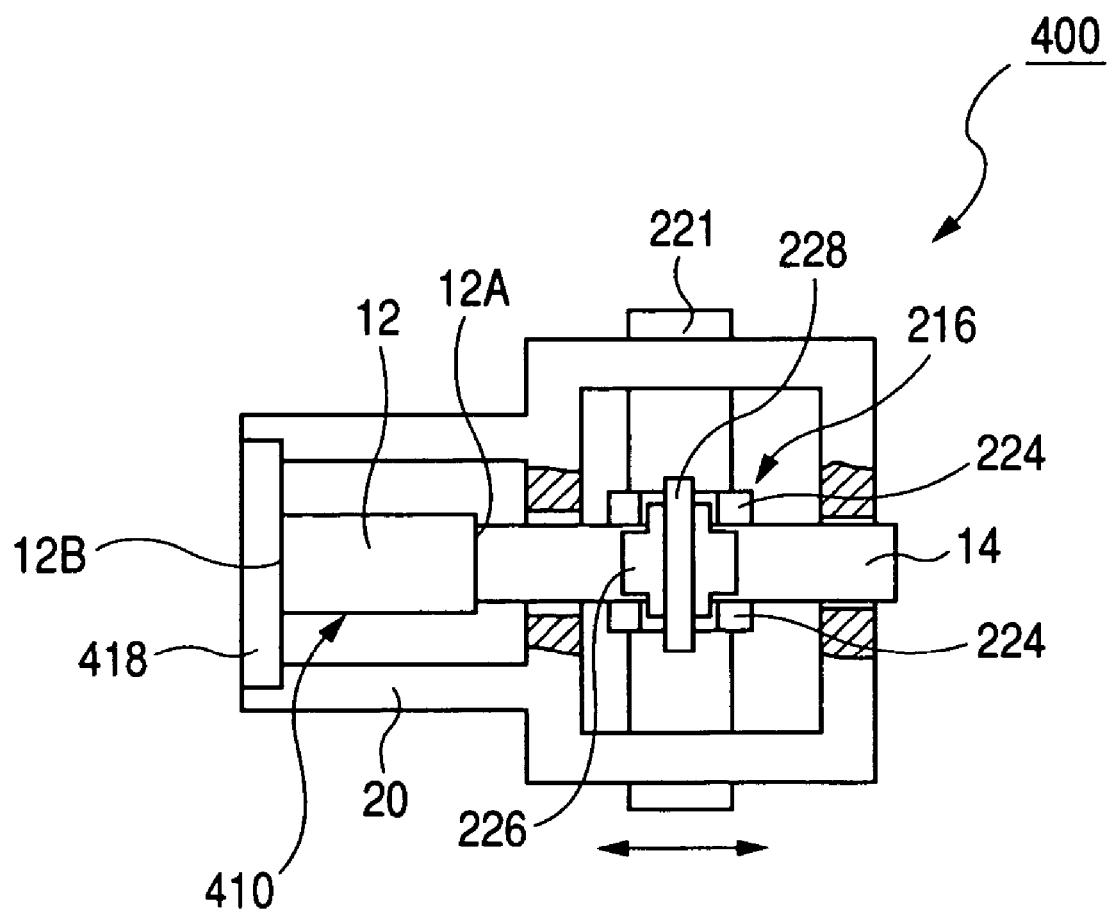
FIG. 10 is a plan view showing a driving mechanism of a fourth embodiment in the present invention.

As shown in FIG. 10, the driving mechanism 400 is different from the driving mechanism 200 in that a weight member 418 made with a soft material is shaped into a thin plate form having a larger surface than the end surface 12B of a piezoelectric element 12, the piezoelectric element 12 is adhered and fixed at the center of the weight member 418, and both ends of the weight member 418 are adhered and fixed to a body 20. According to the thus constituted driving mechanism 400 of the present embodiment, since the end surface 12B at the rear end of the piezoelectric element 12 is supported to the body 20 by the thin-plate shaped weight member 418, the weight member 418 is deformed flexibly to cause displacement at the end surface 12B at the rear end of the piezoelectric element 12. Further, since the weight member 418 is small in Young's modulus, the end surface 12B at the rear end of the piezoelectric element 12 is supported in a state that it is practically kept free due to the elastic deformation of the weight member 418 itself. Therefore, the resonance frequency $f_0$ is allowed to be decreased and the driving frequency f is allowed to be used in a winder range of $f \geq 2^{1/2} \cdot f_0$, which is a vibration-isolating range. It is, therefore, possible to prevent resonance of the component system and also to secure constantly a stable driving capacity.

Next, an explanation will be made for a driving mechanism 500 of a fifth embodiment in the present invention.

Figure 11:
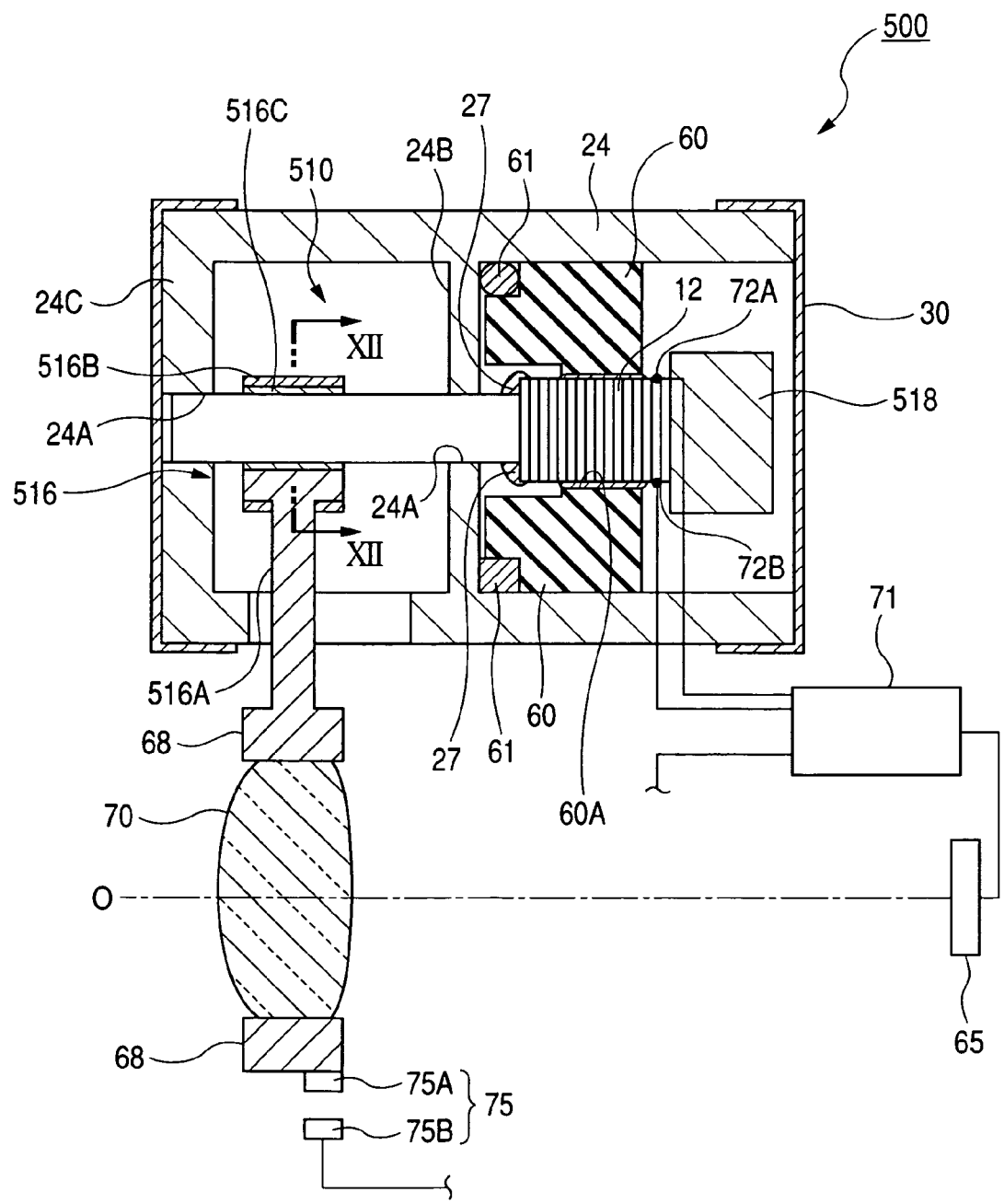
FIG. 11 is a plan view showing a driving mechanism of a fifth embodiment in the present invention.

FIG. 11 is a sectional view showing the driving mechanism 500 of the fifth embodiment in the present invention. As shown in FIG. 11, the driving mechanism 500 of the present embodiment is to drive a zoom lens 70, with the zoom lens 70 being taken as an object to be moved, and provided with an actuator 510 having a piezoelectric element 12 and a driving member 14, a support member 60 for supporting the actuator 510 and a driven member 516. The piezoelectric element 12 is an electro-mechanical conversion element which can be elongated and contracted by inputting electric signals and also elongated and contracted in a predetermined direction. The piezoelectric element 12 is connected to a controller 71 to undergo elongation and contraction when electric signals are inputted by the controller 71. The piezoelectric element 12 is provided, for example, with two input terminals 72A and 72B. Voltage applied to the input terminals 72A and 72B is repeatedly increased and decreased, thereby causing the piezoelectric element 12 to elongate and contract repeatedly.

A driving member 14 is attached to a piezoelectric element 12, with a longer side opposing the elongating and contracting direction of the piezoelectric element 12. For example, one end of the driving member 14 is in contact with the piezoelectric element 12 and adhered thereto by using an adhesive agent 27. The driving member 14 is a long member and, for example, a cylindrical-shaped member is used for this purpose. The driving member 14 is made with a graphite composite in which graphite crystals are rigidly compounded, for example, carbon graphite. Since carbon graphite, a graphite composite, is similar to beryllium in characteristics but better in workability, it is possible to reduce the cost of the actuator 510. The driving member 14 is supported by a partition portion 24B and a partition portion 24C extending inside from a body 24 so as to move along the longitudinal direction. The partition portion 24B and the partition portion 24C are members for partitioning the movement area of a driven member 516, and also functions as a support member of the driving member 14.

Through holes 24A which are penetrated through the driving member 14 are formed respectively at the partition portion 24B and the partition portion 24C. The partition portion 24B supports the vicinity of an area for attaching the piezoelectric element 12 of the driving member 14, namely, a base end area of the driving member 14. The partition portion 24C supports a leading end area of the driving member 14. A body 24 functions as a frame or a frame member for assembling the actuator 510. The driving member 14 is attached to the piezoelectric element 12 to reciprocate along the longitudinal direction in accordance with the repeated movement of elongation and contraction by the piezoelectric element 12.

It is noted that FIG. 11 shows a case where the driving member 14 is supported at two areas, namely on the leading end and on the base end side by the partition portions 24B and 24C. There is also a case where the driving member 14 is supported either only on the leading end or on the base end side. For example, the through hole 24A of the partition portion 24B is made to be larger in outer diameter than the driving member 14, by which the driving member 14 is supported by the partition portion 24C only at the leading end area. Further, the through hole 24A of the partition portion 24C is made to be larger in outer diameter than the driving member 14, by which the driving member 14 is supported by the partition portion 24B only at the base end area. In addition, FIG. 11 shows a case where the partition portions 24B and 24C supporting the driving member 14 are integrally formed with a body 24. These partition portions 24B and 24C may be separately attached to the body 24. Even if attached separately, they are able to provide an effect and function similar to those obtained in the integral formation.

A driven member 516 is attached to a driving member 14 so as to make a movement. The driven member 516 is attached to the driving member 14 through a frictional engagement and allowed to move along the longitudinal direction. For example, the driven member 516 is engaged with the driving member 14 at a predetermined friction coefficient. The driven member 516 is pressed to the driving member 14 at a predetermined pressing force, by which it is attached so as to produce a certain frictional force on movement. Since a movement force which exceeds the frictional force is imparted to the driven member 516, the driven member 516 moves along the driving member 14 against the frictional force.

An actuator 510 is supported to a body 24 by a support member 60. The support member 60 is to support the actuator 510 in a direction orthogonal to the elongating and contracting direction of the piezoelectric element 12, and arranged between the body 24 for accommodating the actuator 510 and the piezoelectric element 12.

A support member 60 is made with an elastic body, which is more elastic than a predetermined level, and made, for example, with a silicone resin. The support member 60 is provided with an insertion hole 60A for inserting the piezoelectric element 12 and assembled to a body 24 in a state that the piezoelectric element 12 is inserted into the insertion hole 60A. The support member 60 is fastened to the body 24 by using an adhesive agent 61. The support member 60 is also fastened to the piezoelectric element 12 by using an adhesive agent. The support member 60 is made with an elastic body, thereby making it possible to support an actuator 510 so as to move in the elongating and contracting direction of the piezoelectric element 12. FIG. 11 shows two support members 60, namely, on both sides of the piezoelectric element 12. These two support members 60 and 60 are shown because they are viewed from the cross section of one continuous support member 60.

Further, the support member 60 may be fastened to a body 24 and to the piezoelectric element 12 by press-fitting the support member 60 into a space between the body 24 and the piezoelectric element 12 to press the support member 60. For example, the support member 60 is constituted by an elastic body and formed to be larger than a space between the body 24 and the piezoelectric element 12, into which the support member 60 is press-fitted. Thereby, the support member 60 is closely attached to the body 24 and the piezoelectric element 12, and duly placed. In this instance, the piezoelectric element 12 is pressed by the support member 60 on both sides in a direction orthogonal to the elongating and contracting direction, thereby supporting the actuator 510.

In this instance, an explanation was made for a case where the support member 60 was made with a silicone resin. The support member 60 may be constituted by a spring member. For example, the spring member is arranged between the body 24 and the piezoelectric element 12, thereby supporting the actuator 510 to the body 24.

A zoom lens 70 is attached via a lens frame 68 to the driven member 516. The zoom lens 70 is to constitute a photographic optical system of a camera and to be moved by a driving mechanism. The zoom lens 70 is integrally bound to the driven member 516 and designed to move together with the driven member 516. A fixed lens (not shown) is placed on an optical axis O of the zoom lens 70 to constitute the photographic optical system of the camera. Further, an imaging device 65 is placed on the optical axis O. The imaging device 65 is an imaging section for converting an image formed by a photographic optical system to electric signals, and, for example, constituted by a CCD. The imaging device 65 is connected to a controller 71 to output image signals to the controller 71.

A weight member 518 is attached to the end of a piezoelectric element 12. The weight member 518 is a member for transmitting an elongating and contracting force of the piezoelectric element 12 to a driving member 14 and attached to the end of the opposing side of the end to which the driving member 14 of the piezoelectric element 12 is attached. A material which is heavier than the driving member 14 is used as the weight member 518. Further, it is preferable to use a material which is prepared by mixing metal powder with an elastically deformable member as the weight member 518. Mixture of the metal powder increases the weight, and use of the elastically deformable member makes it possible to attenuate an unnecessary resonance in driving the piezoelectric element 12. Further, when the weight member 518 is constituted by a soft member, the resonance frequency of the actuator 510 is made sufficiently smaller as compared with the driving frequency of the piezoelectric element 12, thereby reducing the effect of the resonance.

Further, the weight member 518 is provided in a state that it is not supported or fixed to a body 24. More specifically, the weight member 518 is not directly supported or fixed to the body 24. In other words, the weight member 518 is provided so as not to be supported or fixed for restricting the movement of the body 24 via an adhesive agent or a resin material.

A driving mechanism 500 is provided with a detector 75 for detecting the movement position of a driven member 16. The detector 75 includes, for example, optical detectors such as a photo reflector and a photo interrupter. More specifically, where the detector 75 provided with a reflector 75A and a detecting portion 75B is used, the reflector 75A is attached to a lens frame 68 which is integrally formed with the driven member 516 to emit a detection light from the detecting portion 75B to the reflector 75A, and the light reflected on the reflector 75A is detected at the detecting portion 75B, thereby detecting movement positions of the driven member 516 and the zoom lens 70.

The detector 75 is connected to a controller 71. Output signals of the detector 75 are inputted into the controller 71. The controller 71 performs the entire control of a driving mechanism, and constituted by, for example, a CPU, a ROM, a RAM, an input signal circuit and an output signal circuit. Further, the controller 71 is provided with a driving circuit for driving a piezoelectric element 12 and outputting electric signals for driving the piezoelectric element 12.

Figure 12:
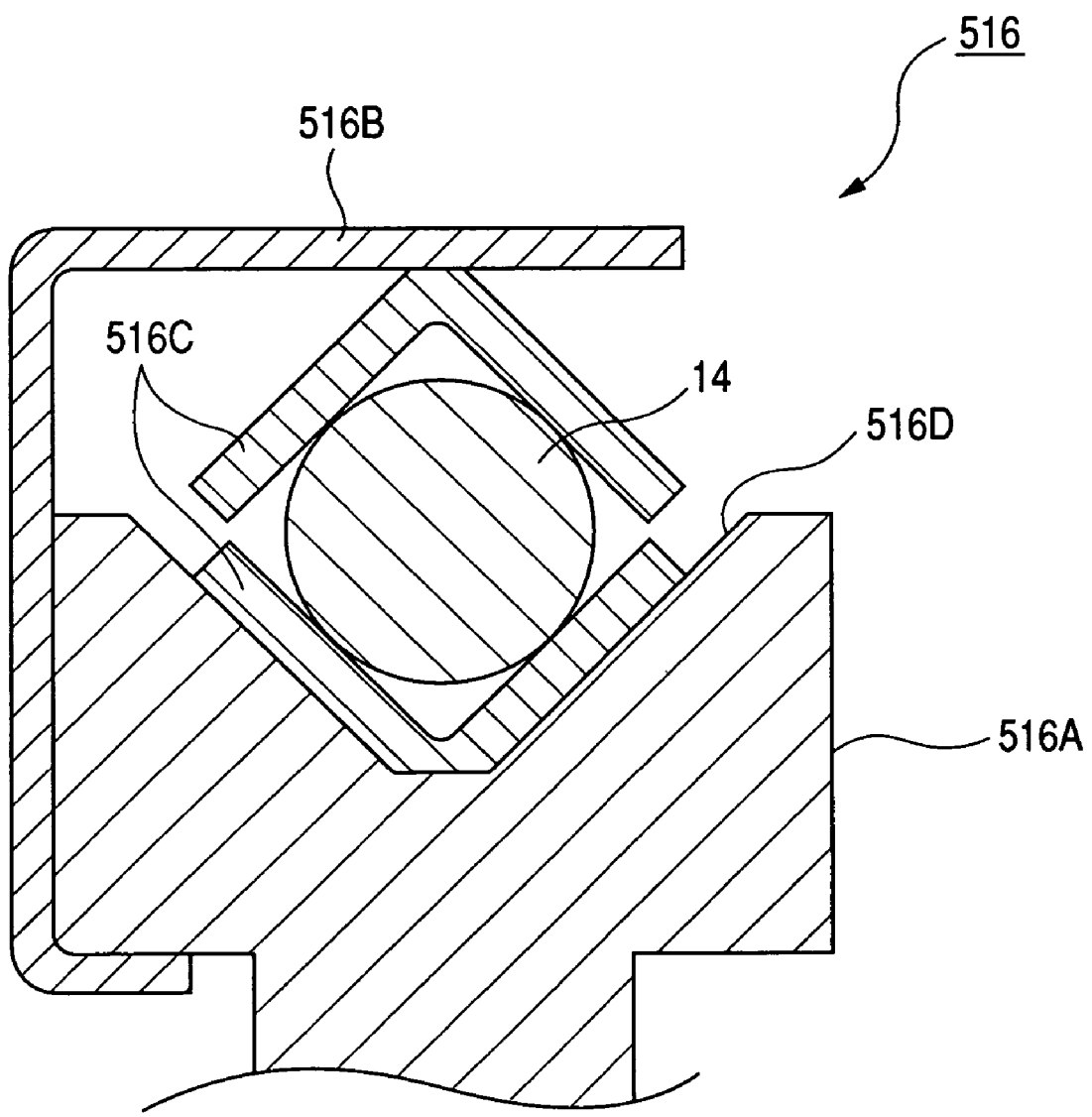
FIG. 12 is a sectional view taken along line XII to XII in FIG. 11.

FIG. 12 is a sectional view of the driven member 516 taken along line XII to XII in FIG. 11. As shown in FIG. 12, the driven member 516 is provided, for example, with a body 516A, a pressing portion 516B and a sliding portion 516C. The body 516A is pressed to a driving member 14 at a certain force by the pressing portion 516B. The body 516A is provided with a V-shaped groove 516D. The driving member 14 is accommodated inside the groove 516D in a state that it is held between two sliding portions 516C and 516C. The sliding portions 516C and 516C are a plate having a V shaped-cross section and arranged so that their recessed portions are opposed to each other. They are provided behind the driving member 14. The driving member 14 is accommodated inside the V-shaped groove 516D, thereby making it possible to attach the driven member 516 to the driving member 14 in a stable manner.

A material, for example, a blade spring having an L-shaped cross section, is used as the pressing portion 516B. One side of the pressing portion 516B is hooked on the body 516A and the other side is placed at a position opposed to the groove 516D, by which the other side is used to hold the driving member 14 accommodated in the groove 516D between the body 516A and the sliding portion 516C. Thereby, the body 516A is allowed to be pressed to the driving member 14.

As described above, the driven member 516 is attached by pressing the body 516A to the driving member 14 at a certain force via the pressing portion 516B, thereby frictionally being engaged with the driving member 14. More specifically, the driven member 516 is attached so that the body 516A and the pressing portion 516B are pressed at a certain pressing force to the driving member 14 to generate a certain frictional force on movement.

Further, since the driving member 14 is held between the sliding portions 516C and 516C having a V-shaped cross section, the driven member 516 is in line contact with the driving member 14 at four sites, or in surface contact, in practice, thereby making a frictional engagement with the driving member 14 in a stable manner.

FIG. 13 is a circuit diagram of a driving circuit which drives a piezoelectric element 12. As shown in FIG. 13, a driving circuit 77 is provided inside a controller 71. The driving circuit 77 functions as a drive circuit of the piezoelectric element 12, outputting a driving electric signal to the piezoelectric element 12. The driving circuit 77 inputs a control signal from a control signal generating portion (not shown) of the controller 71 to amplify the voltage or the current of the signals, thereby outputting the driving electric signal for the piezoelectric element 12. In the driving circuit 77, an input section is constituted, for example, with logical circuits U1 to U3, and an output section is provided with field-effect transistors (FET) Q1 and Q2. The transistors Q1 and Q2 are constituted so as to output an H output (high potential output), a L output (low potential output) and an OFF output (open output) as output signals.

Figure 15A:
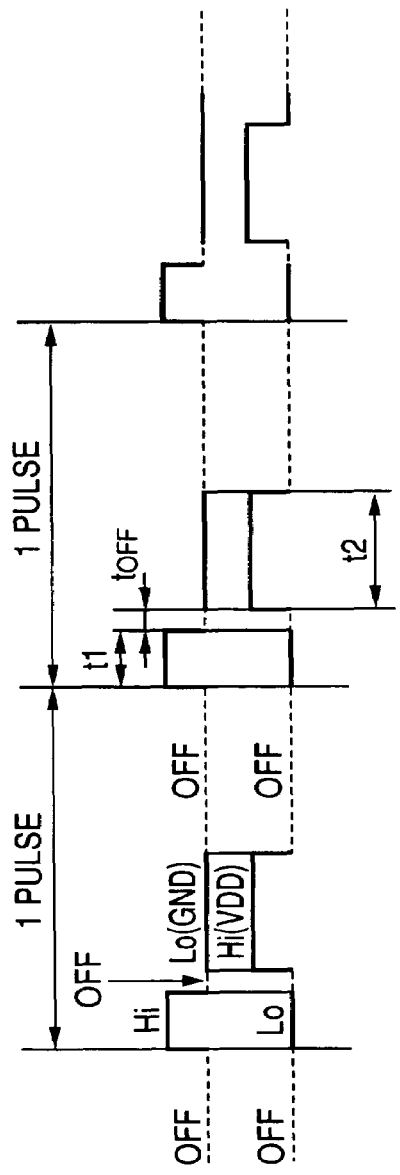
FIGS. 15A and 15B are wave pattern views of output signals to be outputted from the driving circuit of FIG. 13.
Figure 15B:
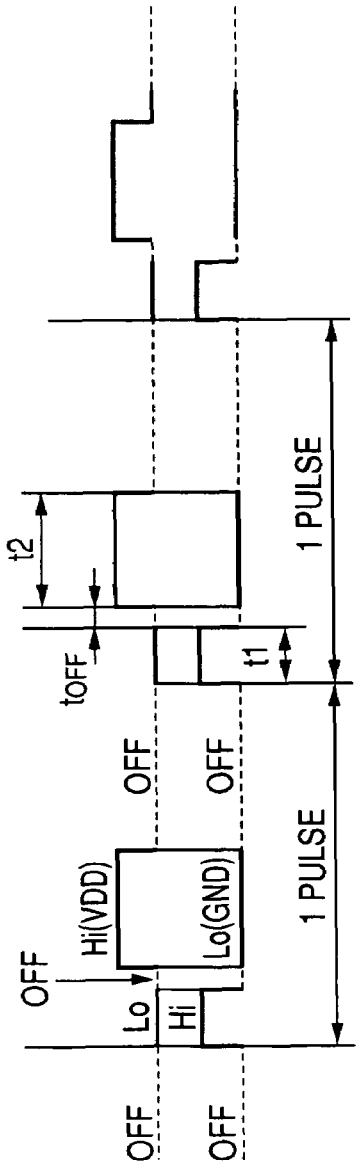

FIGS. 14A and 14B show the input signal to be inputted to the driving circuit 77, and FIGS. 15A and 15B show the output signal to be outputted from the driving circuit 77. FIG. 14A shows the input signal to be inputted when the driven member 516 is moved to a direction which is in access to the piezoelectric element 12 (right direction in FIG. 11). FIG. 14B is the output signal to be input when the driven member 516 is moved to a direction which is spaced apart from the piezoelectric element 12 (left direction in FIG. 11). Further, FIG. 15A is the output signal to be outputted when the driven member 516 is moved to a direction which is in access to the piezoelectric element 12 (right direction in FIG. 11) and FIG. 15B is the output signal to be outputted when the driven member 516 is moved to a direction which is spaced apart from the piezoelectric element 12 (left direction in FIG. 11).

The output signals in FIGS. 15A and 15B are pulse signals which are turned on and off in synchronization with the input signals in FIGS. 14A and 14B. The two signals in FIGS. 15A and 15B are inputted to input terminals 72A and 72B of the piezoelectric element 12. As shown in FIGS. 2A and 2B, signals having the following trapezoidal wave pattern may be inputted into the input terminals 72A and 72B. However, rectangular pulse signals as shown in FIGS. 15A and 15B may also be inputted to operate the piezoelectric element 12. In this case, the rectangular pulse signals may be used for a driving signal of the piezoelectric element 12, thereby making it possible to generate signals easily.

The output signals in FIGS. 15A and 15B are constituted by two types of rectangular pulse signals to give the same frequency. Since these two pulse signals are mutually different in phase, they are signals in which the mutual difference in potential is made great in a stepwise manner and next made small abruptly or the difference in potential is made abruptly great and next made small in a stepwise manner. When two such signals are input, the elongating speed is made different from the contracting speed in the piezoelectric element 12, thereby allowing the driven member 516 to move.

For example, in FIGS. 15A and 15B, it is set that after one of the signals is increased to H (high) and decreased to L (low), the other signal is increased to H. In these signals, it is set that when one of them is decreased to L, the other signal is increased to H, after elapse of a certain time lag $t_{OFF}$. Further, when both of these two signals are decreased to L, the signals are output in an off state (open state).

Signals with the frequency exceeding an audible frequency are used for the output signals in FIGS. 15A and 15B, namely, electric signals for operating the piezoelectric element 12. In FIGS. 15A and 15B, these two signals are those having the frequency exceeding an audible frequency, and they are, for example, signals with the frequency preferably 30 to 80 kHz and more preferably 40 to 60 kHz. The signals with the above-described frequency are used to reduce operating sound in an audible region of the piezoelectric element 12.

Next, a description is given for operation of the driving mechanism according to the present embodiment.

In FIG. 11, electric signals are input to a piezoelectric element 12, by which the piezoelectric element 12 elongates and contracts repeatedly. A driving member 14 reciprocates in accordance with the elongation and contraction. In this case, the piezoelectric element 12 is allowed to elongate or contract at a different speed, thereby allowing the speed of the driving member 14 moving in a certain direction to be different from the speed moving in a reverse direction. Therefore, a driven member 16 and a zoom lens 70 are allowed to move in a desired direction.

On elongation and contraction of a piezoelectric element 12, vibration will result from the elongation and contraction. However, since an actuator 510 including the piezoelectric element 12 is supported by a support member 60 in a direction orthogonal to the elongating and contracting direction, vibration resulting from elongation and contraction of the piezoelectric element 12 is hardly transmitted outside the actuator 510. Consequently, resonance of the actuator 510 with an external member such as a body 24 is suppressed to reduce the effect of the resonance. Therefore, the driven member 516 and the zoom lens 70 are allowed to move accurately.

As described above, in the driving mechanism of the present embodiment, the actuator 510 is supported in a direction orthogonal to the elongating and contracting direction of the piezoelectric element 12, by which vibration between the actuator 510 and an external member is hardly transmitted to reduce the effect of the resonance. Therefore, the driven member 516 and the zoom lens 70 are allowed to move accurately.

The above-described mechanism having the weight member 518 is also able to provide an effect similar to that of the above embodiment, namely, the effect of reducing the resonance frequency to prevent the resonance.

Obviously, the detector 75 for detecting the movement position of the driven member is applicable to other embodiments.

Figure 16:
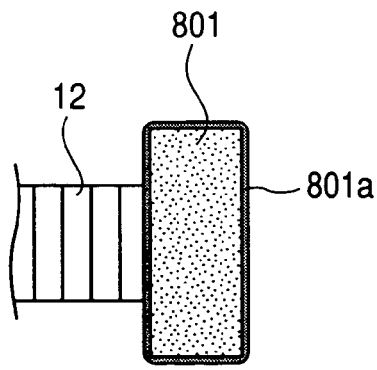
FIG. 16 is a front view showing another example of a weight member.

Here, an explanation will be made for another example of the weight member of the driving mechanism in the above-described embodiment. FIG. 16 is a front view showing a weight member 801 of another example of the weight member.

The weight member 801 is prepared by mixing a resin with metal powders. Obviously, the metal powders are substances having the function as a weight (function of making the mass heavier) and the metal powders are preferably substances which are difficult in oxidation (difficult in rusting). Gold, platinum, silver, copper, SUS (stainless steel), silver, and aluminum are known as a substance which is difficult in oxidation. These metals may be used as metal powders. However, they are expensive and gold, platinum and silver are especially expensive. Further, copper and SUS are high in specific gravity and suitable as a weight. However, they are not a substance which is never oxidized. Therefore, in this instance, tungsten is used as metal powder and olefin elastomer resin is used as a resin. More specifically, the tungsten and the olefin elastomer resin are mixed respectively at 90% by weight or more and at 10% by weight or less.

A moisture-proof film 801a, as a fluorine-based anti-oxidation coating, is formed on the outer surface of the weight member 801. In this instance, anti-oxidation refers to actions which block major compositions from the influence of oxygen and water in the air which are responsible for oxidation, in addition to those in which the film itself is oxidized in place of major compositions for preventing oxidation of these major compositions, thereby preventing or suppressing the oxidation of the major compositions.

The moisture-proof film 801a is formed on the outer surface of the weight member 801 by immersing the weight member 801 into a moisture-proof coating agent, as a transparent liquid anti-oxidation coating agent with the dry solid content of 2.0% and the specific gravity of 1.5 in which a fluorinated solution is used as a solvent or by using a brush to apply the moisture-proof coating agent to the weight member 801. It is preferable that the moisture-proof film 801$a$ is 1 to 3 μm in thickness for immersion and 3 to 5 μm in thickness for brushing. Thereby, the weight member 801 is prevented from the influence of water or corrosion.

The outer surface of the above-described weight member 801 is coated with the moisture-proof film 801$a$, thereby making it possible to suppress the oxidation of tungsten and also prevent the weight member from changing in hardness or specific gravity due to curing of olefin elastomer resin resulting from the oxidation. The weight member 801 is, therefore, able to exhibit a desired function.

Figure 17:
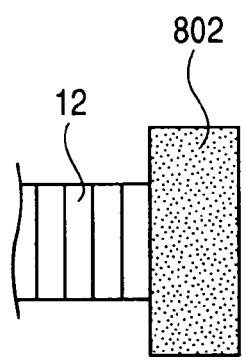
FIG. 17 is a front view further showing another example of a weight member.

FIG. 17 is a front view showing another example of a weight member 802. The weight member 802 is different from the above-described weight member 801 in that the moisture-proof film 801$a$ is not formed on the outer surface of the weight member but tungsten (powder) is immersed, for example, into a silane resin-based moisture proof coating agent to form on the outer surface of the tungsten a moisture-proof coating which acts as an anti-oxidation coating, and the tungsten is mixed with olefin elastomer resin to provide the weight member 802.

Since the tungsten is previously given an anti-oxidation coating treatment, it is possible to prevent the oxidation of the tungsten and also the curing of the olefin elastomer resin. As a result, the weight member 802 is allowed to exhibit a desired function.

Figure 18:
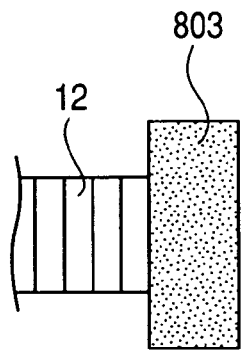
FIG. 18 is a front view still further showing another example of a weight member.

Further, FIG. 18 is a front view showing another example of a weight member 803. The weight member 803 is different from the above-described weight member 801 in that the moisture-proof film 801$a$ is not formed on the outer surface of the weight member but stable tungsten which is previously oxidized, for example, tungsten trioxide, is used as tungsten powder to mix the tungsten with olefin elastomer resin, thereby providing the weight member 803. It is noted that the previously oxidized tungsten may be previously oxidized at least on the outer surface.

Since the tungsten is thus previously oxidized at least on the outer surface, no oxidized compositions develop to prevent the curing of the olefin elastomer resin. As a result, the weight member 803 is allowed to exhibit a desired function.

Figure 19:
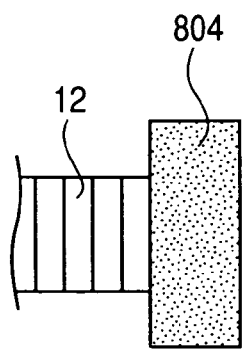
FIG. 19 is a front view still further showing another example of a weight member.

Still further, FIG. 19 is a front view showing another example of a weight member 804. The weight member 804 is different from the above-described weight member 801 in that the moisture-proof film 801$a$ is not formed on the outer surface of the weight member but tungsten (powder) is mixed with a tungsten-oxidation preventive resin, for example, a moisture-proof resin, to provide the weight member 804. The moisture-proof resin includes that in which predetermined substances are added to a resin to improve the affinity and adhesiveness of the tungsten and the resin, and, for example, that in which fillers are added to olefin elastomer resin.

As described above, the resin acts to prevent the oxidization of tungsten, thereby making it possible to prevent the oxidation of the tungsten and also the curing of the resin. As a result, the weight member 804 is allowed to exhibit a desired function.

Figure 20:
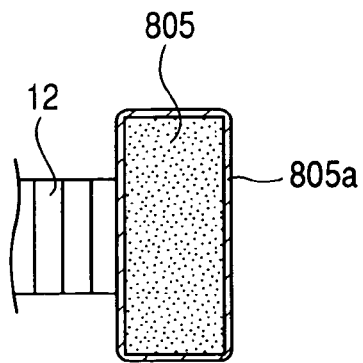
FIG. 20 is a front view still further showing another example of a weight member.

In addition, FIG. 20 is a front view showing another example of a weight member 805. The weight member 805 is different from the above-described weight member 801 in that the moisture-proof film 801$a$ is not formed on the outer surface of the weight member but the weight member 805 is coated with an adhesive agent 805$a$.

As described above, since the weight member 805 is coated with the adhesive agent 805$a$, it is possible to prevent oxidation of tungsten (powder). Further, since the weight member 805 is coated with the adhesive agent 805$a$, the adhesive agent 805$a$ can also be used as an adhesive agent for fixing the weight member 805 to a piezoelectric element 12. In this instance, the adhesive agent 805$a$ is to be a thermosetting adhesive agent. When the weight member 805 coated with a thermosetting adhesive agent is placed on the piezoelectric element 12 and heat is applied thereto, it is possible to fix satisfactorily the piezoelectric element 12 to the weight member 805.

It is noted that the metal powder constituting the weight members 801 through 805 is not restricted to tungsten, but may include materials such as gold, platinum, silver, copper, SUS, silver, and aluminum. These materials provide an effect and the action similar to those obtained when tungsten is used. Further, the resin is not restricted to olefin elastomer resin.

Figure 21:
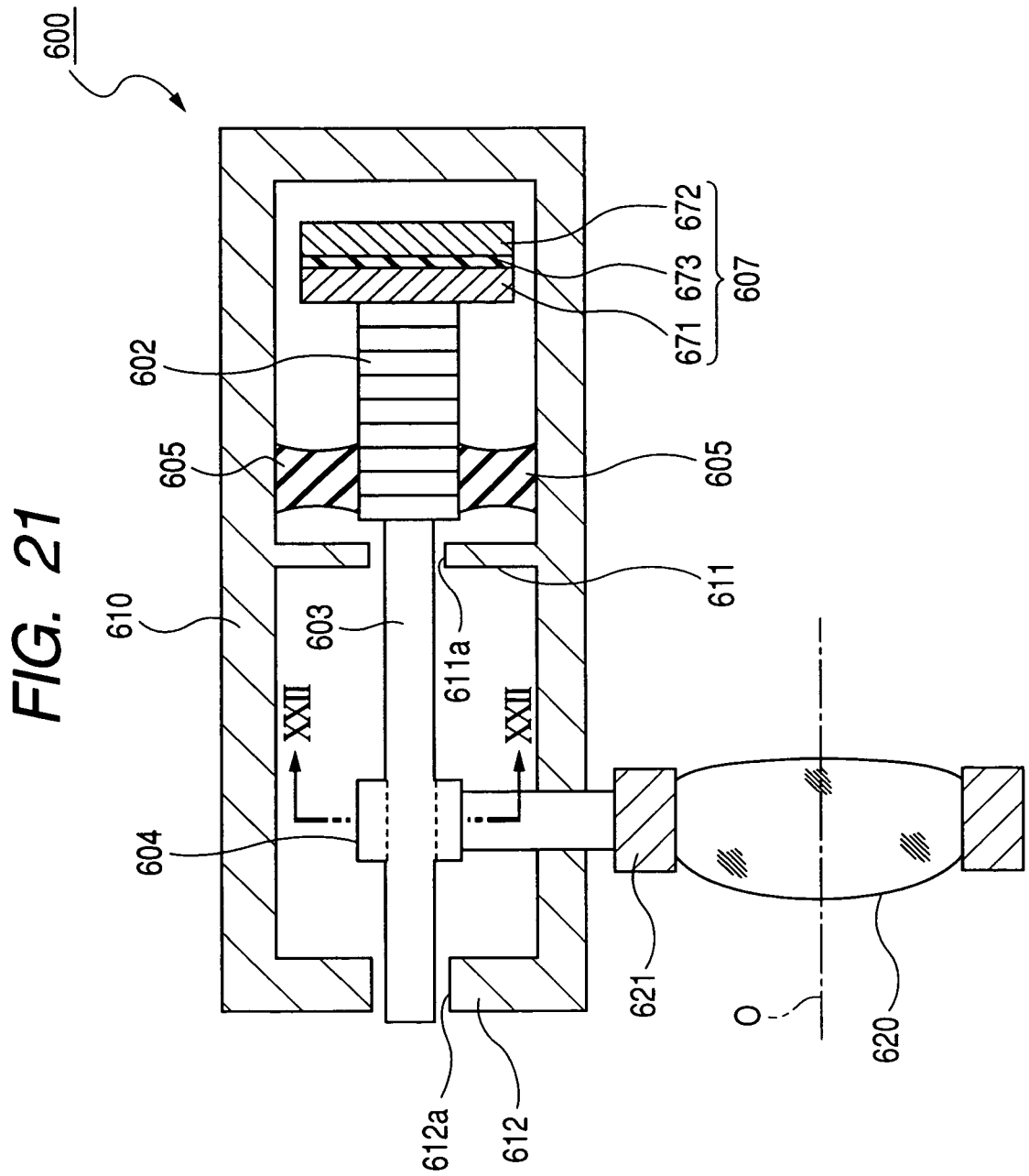
FIG. 21 is a sectional view showing a driving mechanism of a sixth embodiment in the present invention.

Next, an explanation will be made for a driving mechanism 600 of a sixth embodiment in the present invention. FIG. 21 is a sectional view showing the driving mechanism of the sixth embodiment in the present invention.

As shown in FIG. 21, the driving mechanism 600 of the present embodiment is to drive a zoom lens 620, with the zoom lens 620 being taken as an object to be moved, and provided with a piezoelectric element 602, a driving member 603, a driven member 604, a support member 605 and a weight member 607. The piezoelectric element 602 is an electro-mechanical conversion element which can be elongated and contracted by inputting electric signals and also elongated and contracted in a predetermined direction. The piezoelectric element 602 is connected to a controller (not shown) to undergo elongation and contraction when electric signals are inputted by the controller. For example, used is a piezoelectric element 602 provided with two input terminals. Voltage applied to the input terminals is repeatedly increased and decreased, thereby causing the piezoelectric element 602 to elongate and contract repeatedly.

A driving member 603 is attached to a piezoelectric element 602, with a longer side opposed to the elongating and contracting direction of the piezoelectric element 602. For example, one end of a driving member 603 is in contact with the piezoelectric element 602 and adhered thereto by using an adhesive agent. The driving member 603 is a long member and, for example, a cylindrical-shaped member is used for this purpose. The driving member 603 is made with a graphite composite in which graphite crystals are rigidly compounded, for example, carbon graphite. The driving member 603 is attached to the piezoelectric element 602 to reciprocate along the longitudinal direction in accordance with the repeated movement of elongation and contraction by the piezoelectric element 602.

A driven member 604 is attached to a driving member 603 so as to make a movement. The driven member 604 is attached to the driving member 603 through a frictional engagement and allowed to move along the longitudinal direction. For example, the driven member 604 is engaged with the driving member 603 at a predetermined friction coefficient. The driven member 604 is pressed to the driving member 603 at a predetermined pressing force, by which it is attached so as to produce a certain frictional force on movement. Since a movement force which exceeds the frictional force is imparted to the driven member 604, the driven member 604 moves along the driving member 603 against the frictional force.

A support member 605 is placed between a piezoelectric element 602 and a body 610. The support member 605 is to support a driving member 603 to the body 610 so as to move along the longitudinal direction, supporting the driving member 603 to the body 610 via the piezoelectric element 602 so as to make a movement. The support member 605 includes an elastically deformable member which will elastically deform according to the elongation and contraction of the piezoelectric element 602. For example, a cured silicone resin is used for this purpose.

The support member 605 may not necessarily support the driving member 603 indirectly as shown in FIG. 21 but may support the driving member 603 directly. For example, it may support the driving member 603 directly by using, for example, a member provided between the driving member 603 and the body 610.

A body 610 functions as a frame or a frame member for assembling a piezoelectric element 602 and a driving member 603. The body 610 is provided with partition portions 611 and 612 for partitioning a region for placing the piezoelectric element 602 and a region for placing the driven member 604. These partition portions 611 and 612 are provided with through holes 611a and 612a through which the driving member 603 is penetrated. In FIG. 21, these through holes 611a and 612a are made sufficiently larger than the diameter of the driving member 603, the inner circumference of which is arranged so as not to be in contact with the outer circumference of the driving member 603. However, the through holes 611a and 612a are made exactly to be a size which permits the driving member 603 to pass through, and the driving member 603 is supported by the partition portions 611 and 612 so as to make a movement, by which the partition portions 611 and 612 are allowed to function as a support member.

A zoom lens 620 is attached via a lens frame 621 to the driven member 604. The zoom lens 620 is to constitute a photographic optical system of a camera and to be moved by a driving mechanism 600. The zoom lens 620 is integrally coupled to the driven member 604 and designed to move together with the driven member 604. A fixed lens (not shown) is placed on an optical axis O of the zoom lens 620 to constitute the photographic optical system of the camera.

A weight member 607 is attached to the end of a piezoelectric element 602. The weight member 607 is a member for transmitting an elongating and contracting force of the piezoelectric element 602 to a driving member 603 and attached to the end of the opposite side to the end to which the driving member 603 of the piezoelectric element 602 is attached.

The weight member 607 is constituted by a metal and a viscoelastic body, and formed, for example, by allowing a viscoelastic member 673 to be held between metal plates 671 and 672. These metal plates 671, 672 and the viscoelastic member 673 are provided so as to be laminated sequentially in a longitudinal direction of a driving member 603. The viscoelastic member 673 is a member having viscosity and elasticity which are greater than predetermined values, attenuating an unnecessary resonant vibration resulting from elongation and contraction of the piezoelectric element 602. The viscoelastic member 673 includes, for example, resin materials, adhesive agents, damper grease, double-sided adhesive tapes and piezoelectric paints.

It is preferable that the viscoelastic member 673 is formed in such a thickness as to attenuate the resonant vibration between a piezoelectric element 602 and a weight member 607 to a greater extent than vibration resulting from the elongation and contraction of the piezoelectric element 602. In this instance, the unnecessary resonant vibration can be reduced in a state that transmission of an elongating and contracting force of the piezoelectric element 602 to a driving member 603 is hardly suppressed.

In FIG. 21, the viscoelastic member 673 is held between two metal plates 671 and 672 to constitute a weight member 607. However, three or more metal plates may be used to hold the viscoelastic member 673 therebetween. Further, in place of the metal plates 671 and 672, a metal body which is not in a plate shape but in a block shape may be used to constitute the weight member 607.

Further, a weight member 607 is provided in a state that it is not supported or fixed to a body 610. More specifically, the weight member 607 is not directly supported or fixed to the body 610. The weight member 607 is provided so as not to be supported or fixed for restricting the movement to the body 610 via an adhesive agent or a resin material.

Figure 22:
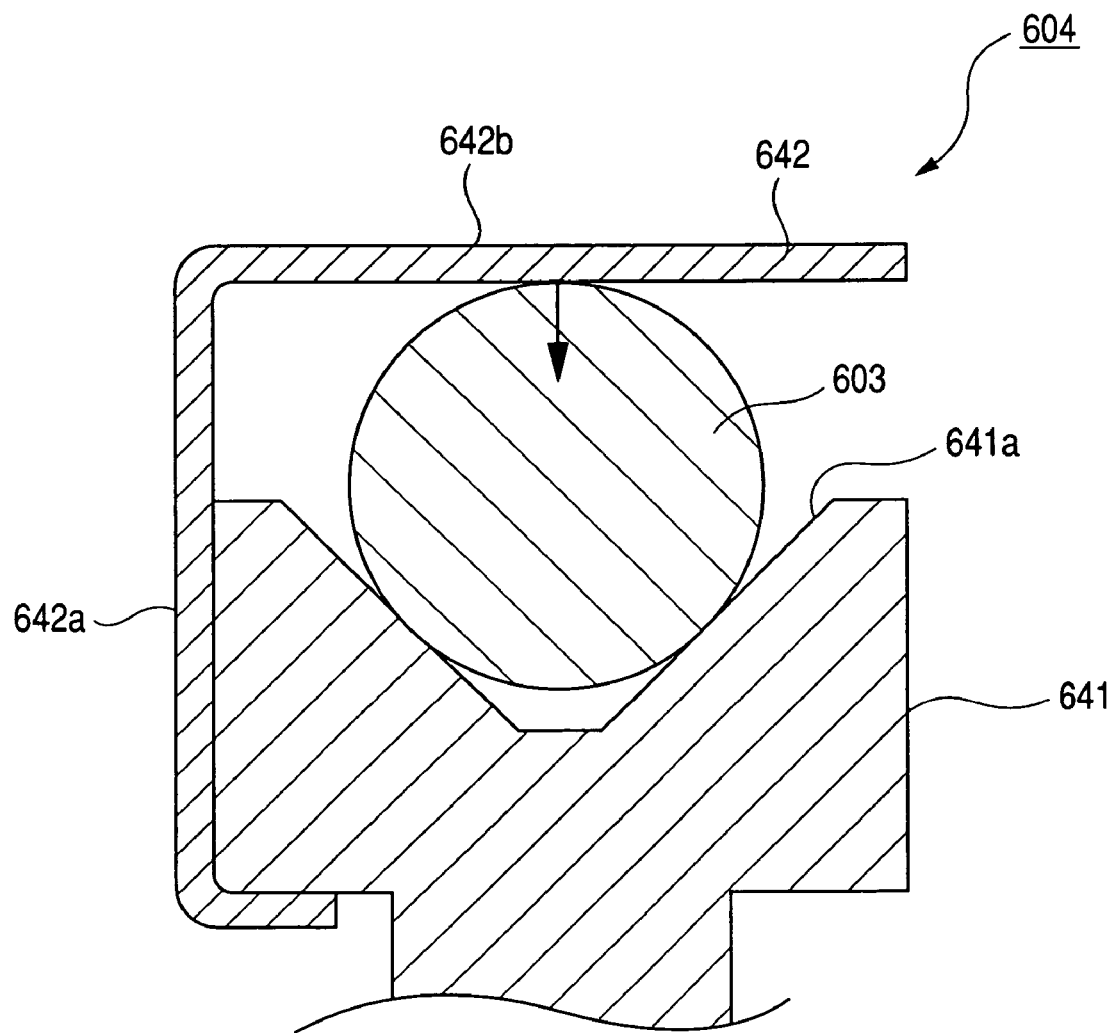
FIG. 22 is a sectional view showing a driven member taken along line XXII to XXII in the driving mechanism of FIG. 16.

FIG. 22 is a sectional view of the driven member 604 taken along line XXII to XXII in FIG. 21.

As shown in FIG. 21, the driven member 604 is provided, for example, with a body 641 and a pressing portion 642. The body 641 is pressed to a driving member 603 at a certain force by the pressing portion 642. The body 641 is provided with a V-shaped groove 641a. The body 641 is placed so that the driving member 603 is in contact with the inner surface of the groove 641a. The V-shaped groove 641a is used to place the driven member 604, thereby making it possible to attach the driven member 604 to the driving member 603 in a stable manner.

A material, for example, a blade spring having the L-shaped cross section, is used as the pressing portion 642. One side 642a of the pressing portion 642 is hooked on the body 641 and the other side 642b is placed at a position opposite the groove 641a, by which the driving member 603 accommodated in the groove 641a can be held between the other side 642b and the body 641. Thereby, the body 641 is allowed to be pressed to the driving member 603 side.

As described above, the driven member 604 is in line contact with the driving member 603 at three sites, namely, V-shape groove 641a of the pressing portion 642 and the pressing portion 642, and in practice in surface contact. Further, the driven member 604 is frictionally engaged with the driving member 603 by pressing at a certain force the body 641 to the driving member 3 side for attachment. The driven member 604 is pressed to the driving member 603 at a predetermined pressing force via the body 641 and the pressing portion 642, by which it is attached so as to produce a certain frictional force on movement.

Next, an explanation will be made for a driving mechanism 600 of the present embodiment.

Figure 23:
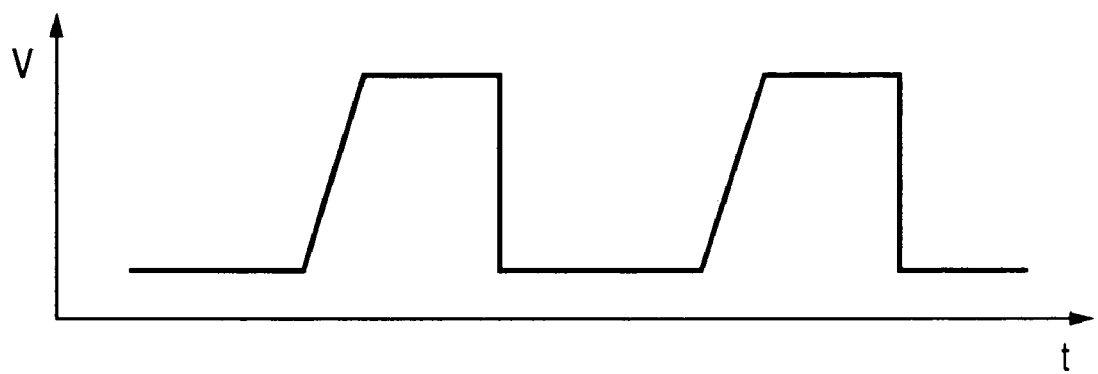
FIG. 23 is a view explaining an electric signal to be inputted to a piezoelectric element of the driving mechanism of FIG. 16.

In FIG. 21, an electric signal is inputted to a piezoelectric element 602, by which the piezoelectric element 602 elongates and contracts repeatedly. The electric signal includes that by which the piezoelectric element 602 is elongated and contracted so that the piezoelectric element 602 can be elongated and contracted at a different speed. For example, as shown in FIG. 23 and FIG. 24, a pulse signal is used in which the voltage is made different in elevating speed (increasing speed) and in falling speed (decreasing speed).

Where the electric signal given in FIG. 23 is inputted to a piezoelectric element 602, the piezoelectric element 602 will elongate slowly and contract quickly due to a slowly elevating speed and a quickly falling speed of voltage. Therefore, a driving member 603 moves slowly toward a direction at which it is spaced apart from the piezoelectric element 602 and moves quickly to a direction at which it comes closer to the piezoelectric element 602. At this moment, the piezoelectric element 602 and the driving member 603 are supported by a support member 605 so as to make a movement. A weight member 607 greater in weight is provided, thereby resulting in a fact that the weight member 607 does not move greatly but the driving member 603 moves in accordance with the elongation and contraction of the piezoelectric element 602.

The driven member 604 slowly moves toward a direction at which it is spaced apart from the driving member 603, thereby moving together with the driving member 603. In contrast, even where the driven member 604 moves quickly toward a direction at which it comes closer to the driving member 603, it does not move together with the driving member 603 due to inertia. Therefore, when the driving member 603 is reciprocated repeatedly, the driven member 604 moves toward a direction at which it is spaced apart from the piezoelectric element 602. Then, a zoom lens 620 mounted integrally with the driven member 604 also moves toward a direction at which it is spaced apart from the piezoelectric element 602.

Figure 24:
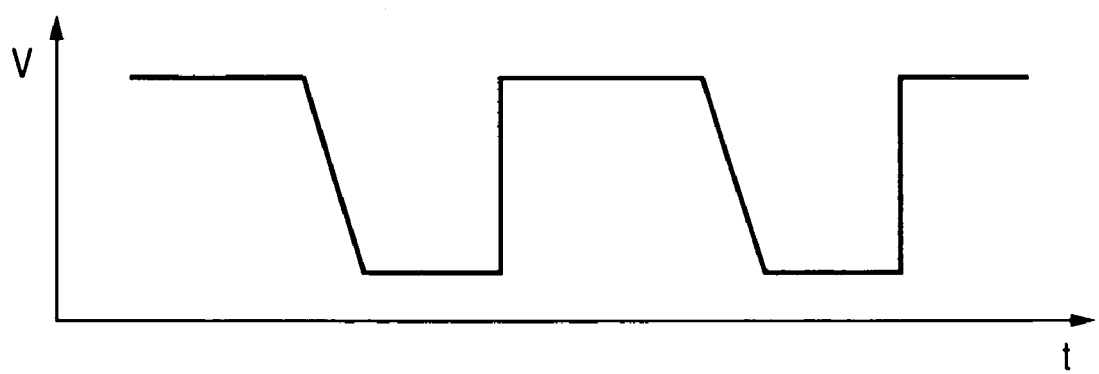
FIG. 24 is a view explaining an electric signal to be inputted to a piezoelectric element of the driving mechanism of FIG. 16.

However, where the electric signal given in FIG. 24 is inputted to a piezoelectric element 602, the piezoelectric element 602 will elongate quickly and contract slowly due to a quickly elevating speed and a slowly falling speed of voltage. Therefore, a driving member 603 moves quickly toward a direction at which it is spaced apart from the piezoelectric element 602 and moves slowly toward a direction at which it comes closer to the piezoelectric element 602.

In this instance, the driven member 604 quickly moves toward a direction at which it is spaced apart from the driving member 603 but does not move together with the driving member 603 due to inertia, in spite of movement of the driving member 603. On the other hand, the driven member 604 moves slowly toward a direction at which it comes closer to the driving member 603, thereby moving together with the driving member 603. Therefore, when the driving member 603 is reciprocated repeatedly, the driven member 604 moves toward a direction at which it comes closer to the piezoelectric element 602. Then, a zoom lens 620 mounted integrally with the driven member 604 also moves toward a direction at which it comes closer to the piezoelectric element 602.

As described above, certain electric signals are inputted to the piezoelectric element 602, thereby making it possible to control the movement of the driven member 604 and the zoom lens 620.

Therefore, according to the driving mechanism 600 of the present embodiment, a piezoelectric element 602 is not fixed to a body 610, but a weight member 607 is attached to the piezoelectric element 602 to transmit an elongating and contracting force to the driving member 603. Thus, vibration resulting from elongation and contraction of the piezoelectric element 602 is hardly transmitted to the body 610. The vibration is prevented from resonating with the body 610, thereby making it possible to reduce resonant vibration which is not necessary for driving.

Further, according to the driving mechanism 600 of the present embodiment, a viscoelastic member 673 is placed on a weight member 607. Therefore, even on development of resonance which is not necessary for driving, vibration resulting from the resonance can be reduced smoothly. In other words, vibration resulting from the resonance, which is not necessary for driving, can be reduced to provide an accurate and stable driving.

Figure 25:
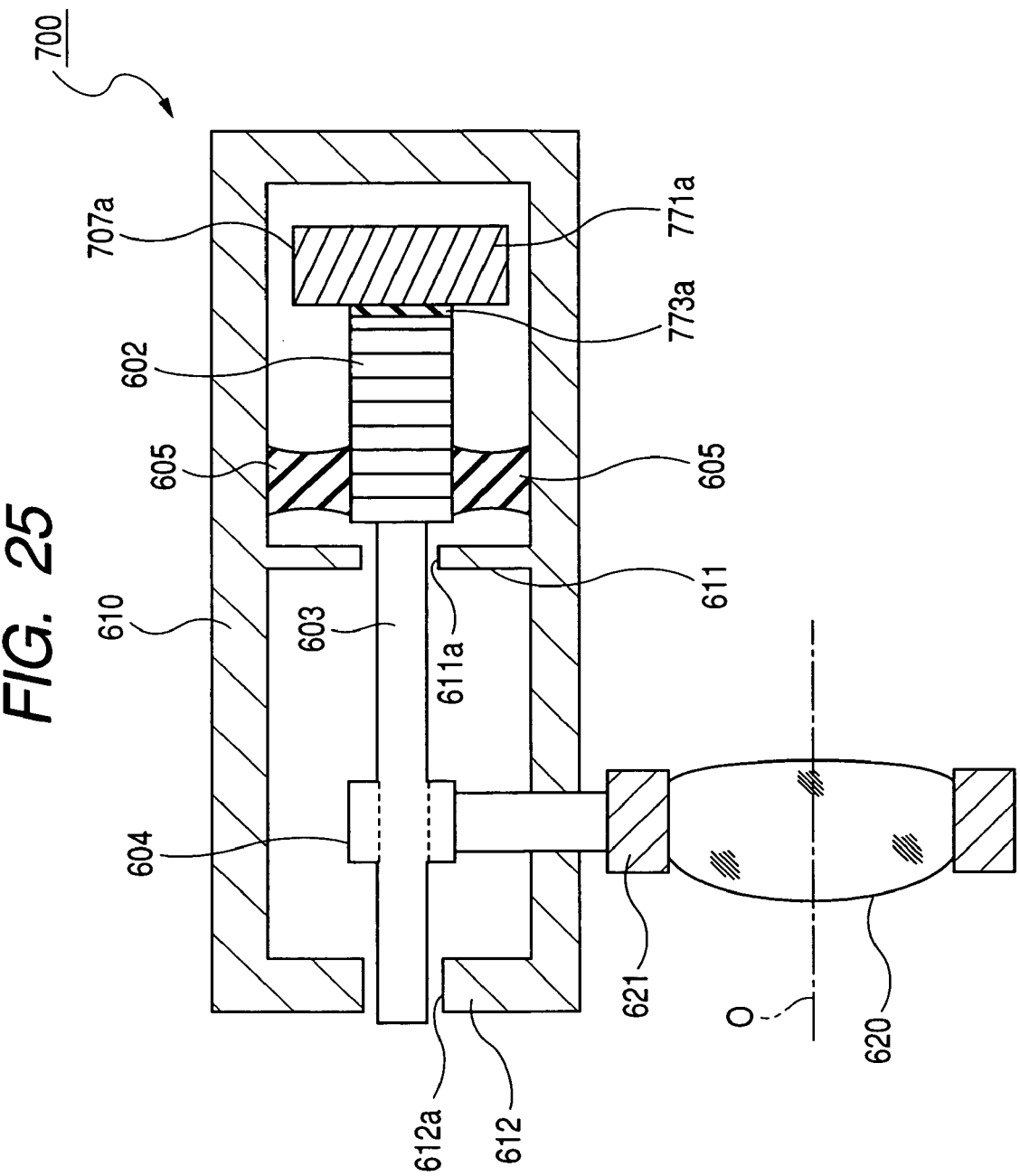
FIG. 25 is a sectional view showing a driving mechanism of a seventh embodiment in the present invention.

Next, an explanation will be made for a driving mechanism 700 of a seventh embodiment in the present invention. FIG. 25 is a sectional view showing the driving mechanism of the present embodiment. As shown in FIG. 25, the driving mechanism 700 of the present embodiment is substantially similar in constitution to the above-described driving mechanism 600 of the sixth embodiment, but different in that a weight member 707a is constituted by a metal body 771a and a viscoelastic member 773a.

In the driving mechanism 700 of the embodiment, the metal body 771a is attached to the end of the piezoelectric element 602 via the viscoelastic member 773a to provide a weight member 707a. The weight member 707a is a member for transmitting an elongating and contracting force of the piezoelectric element 602 to the driving member 603 side.

The viscoelastic member 773a is a member having viscosity and elasticity which are greater than predetermined values, attenuating an unnecessary resonant vibration resulting from elongation and contraction of the piezoelectric element 602. The viscoelastic member 773a includes, for example, resin materials, adhesive agents, damper grease, double-sided adhesive tapes and piezoelectric paints. It is preferable that the viscoelastic member 773a is formed in such a thickness as to attenuate resonant vibration between the piezoelectric element 602 and the weight member 707a.

Further, the weight member 707a is provided in a state that it is not supported or fixed to the body 610. More specifically, the weight member 707a is not directly supported or fixed to the body 610. In other words, the weight member 707a is provided so as not to be supported or fixed for restricting the movement to the body 610 via an adhesive agent or a resin material.

The thus constituted driving mechanism 700 of the present embodiment is also able to provide the effect and the action substantially similar to those of the driving mechanism 600 of the sixth embodiment. Namely, a piezoelectric element 602 is not fixed to a body 610, but a weight member 707a is attached to the piezoelectric element 602 to transmit an elongating and contracting force to the driving member 603. Thus, vibration resulting from elongation and contraction of the piezoelectric element 602 is hardly transmitted to the body 610. The vibration is prevented from resonating with the body 610, thereby making it possible to reduce the resonant vibration which is not necessary for driving.

Further, according to the driving mechanism 700 of the present embodiment, a viscoelastic member 773a is placed between a piezoelectric element 602 and a metal body 771a. Therefore, even on development of resonance which is not necessary for driving, resonant vibration can be attenuated smoothly by the viscoelastic member 773a. In other words, the resonant vibration, which is not necessary for driving, can be reduced to provide an accurate and stable driving.

It is noted that in this instance the weight member 707a is constituted by the metal body 771a and the viscoelastic member 773a. However, a viscoelastic member may be provided between the piezoelectric element and the weight member (part indicated by the number 771a) or, in place of a viscoelastic body, a member made with a soft material or an elastic material may be used.

Next, an explanation will be made for a driving mechanism of an eighth embodiment in the present invention.

The driving mechanism of the present embodiment is substantially similar in constitution to the above-described driving mechanisms of the sixth embodiment and the seventh embodiment but different from the driving mechanisms of the sixth embodiment and the seventh embodiment in that a weight member is constituted by a viscoelastic body. The weight member is constituted, for example, by a viscoelastic member such as a resin material. In this instance, metal powders may be added to the viscoelastic member in order to make the weight member heavier.

The thus constituted driving mechanism of the present embodiment is also able to provide an effect and action substantially similar to those of the driving mechanism of the sixth embodiment and the seventh embodiment. Namely, a piezoelectric element is not fixed to a stationary member, but a weight member is attached to the piezoelectric element to transmit an elongating and contracting force to the driving member. Thus, vibration resulting from elongation and contraction of the piezoelectric element is hardly transmitted to the stationary member. The vibration is prevented from resonating with the stationary member, thereby making it possible to reduce the resonant vibration which is not necessary for driving.

Further, according to the driving mechanism of the present embodiment, a weight member is constituted by a viscoelastic member. Therefore, even on development of resonance which is not necessary for driving, resonant vibration can be attenuated smoothly by the weight member as a viscoelastic member. In other words, the resonant vibration, which is not necessary for driving, can be reduced to provide an accurate and stable driving.

It is noted that the above-described individual embodiments show one example of the driving mechanisms in the present invention. The driving mechanisms of the present invention are not restricted to these driving mechanisms shown in the embodiments but may be modified or applicable to others within a scope of the present invention, which is not deviated from the description of each Claim.

The actuator of the present invention may be used in small precision instruments, for example, a digital camera and a cellular phone. In particular, when the actuator of the present invention is used in a cellular phone, the driven member is allowed to be driven at a high speed of 2 mm/s or more. Thereby, a zoom lens which must be moved to a distance of about 10 mm is allowed to move quickly. Further, the actuator of the present invention is not restricted to an application in which zoom lenses such as a focus lens and a zoom lens are moved, but may also be used in an area where a CCD is moved.

Further, an explanation was made for a mechanism applied to the driving mechanism to drive a zoom lens 70, for example, in the fifth embodiment. However, the present invention may be applicable to a driving mechanism for driving an object other than a zoom lens 70.

According to the present invention, a weight member for reducing the resonance frequency of an actuator mounted on the other end side of an electro-mechanical conversion element is effective in lowering the resonance frequency of the actuator itself which is constituted by an electro-mechanical conversion element, a driving member and a weight member, thereby making it possible to drive the electro-mechanical conversion element in a range substantially free of the effect of the resonance. It is, therefore, possible to prevent the driving member from being displaced by the effect of the resonance in a direction other than the elongating and contracting direction of the electro-mechanical conversion element and also to drive and control accurately and stably the driven member in the elongating and contracting direction of the electro-mechanical conversion element.

The entire disclosure of each and every foreign patent application from which the benefit of foreign priority has been claimed in the present application is incorporated herein by reference, as if fully set forth.

What is claimed is:

1. A driving mechanism comprising:
an actuator comprising:
an electro-mechanical conversion element;
a driving member which is connected to one end of the electro-mechanical conversion element and moves in accordance with elongation or contraction of the electro-mechanical conversion element; and
a weight member provided on the other end of the electro-mechanical conversion element; and
a driven member frictionally engaged with the driving member,
wherein the actuator allows the driven member to move along the driving member, and
the weight member comprises a member which reduces a resonance frequency of the actuator.

2. The driving mechanism as set forth in claim 1, wherein a material of the weight member is smaller in Young's modulus than a material of the electro-mechanical conversion element.

3. The driving mechanism as set forth in claim 1, wherein a material of the weight member is 1 GPa or lower in Young's modulus.

4. The driving mechanism as set forth in claim 1 wherein the weight member comprises a soft material, an elastic body or a viscoelastic material, so as to reduce resonance frequency of the actuator to a greater extent than a case where a weight member constituted by a rigid material is provided.

5. The driving mechanism as set forth in claim 1, wherein the weight member comprises a metal and a viscoelastic material.

6. The driving mechanism as set forth in claim 1, wherein a viscoelastic material, a soft material or an elastic material is provided between the electro-mechanical conversion element and the weight member.

7. The driving mechanism as set forth in claim 1, wherein the driving member is supported on at least one of its leading end side and its base end side, so as to move in elongating and contracting directions of the electro-mechanical conversion element.

8. The driving mechanism as set forth in claim 1, further comprising a cabinet,
wherein the actuator is supported laterally to the cabinet in the elongating and contracting directions of the electro-mechanical conversion element.

9. The driving mechanism as set forth in claim 1, further comprising a driving section that generates asymmetric signals in the elongating and contracting directions so as to drive the electro-mechanical conversion element.

10. The driving mechanism as set forth in claim 1, wherein the driven member is in surface contact with the driving member.

11. The driving mechanism as set forth in claim 1, further comprising a detecting section that detects a movement position of the driven member.

12. The driving mechanism as set forth in claim 1, wherein the electro-mechanical conversion element is driven at a driving frequency exceeding an audible frequency.

13. A photographic mechanism comprising:
the driving mechanism as set forth in claim 1; and
an optical member connected to the driven member of the driving mechanism.

14. A cellular phone comprising the driving mechanism as set forth in claim 1.

15. The driving mechanism as set forth in claim 1, wherein the material of the weight member is 300 MPa or lower in Young's modulus.

16. A cellular phone comprising the photographic mechanism as set forth in claim 13.

17. A driving mechanism comprising:
an actuator comprising:
an electro-mechanical conversion element;
a driving member which is connected to one end of the electro-mechanical conversion element and moves in accordance with elongation or contraction of the electro-mechanical conversion element; and a weight member provided on the other end of the electro-mechanical conversion element; and a driven member frictionally engaged with the driving member, wherein the actuator allows the driven member to move along the driving member, the weight member comprises a member which reduces a resonance frequency of the actuator, and a value obtained by dividing a specific gravity of the weight member by Young's modulus of the weight member is $1.8 \times 10^{-9}$ or greater.

18. A driving mechanism comprising:
an actuator comprising:
    an electro-mechanical conversion element;
    a driving member which is connected to one end of the electro-mechanical conversion element and moves in accordance with elongation or contraction of the electro-mechanical conversion element; and
    a weight member provided on the other end of the electro-mechanical conversion element; and
a driven member frictionally engaged with the driving member,
wherein the actuator allows the driven member to move along the driving member,
the weight member comprises a member which reduces a resonance frequency of the actuator, and
the weight member comprises a soft material, an elastic body or a viscoelastic material.

19. A driving mechanism comprising:
an actuator comprising:
    an electro-mechanical conversion element;
    a driving member which is connected to one end of the electro-mechanical conversion element and moves in accordance with elongation or contraction of the electro-mechanical conversion element; and
    a weight member provided on the other end of the electro-mechanical conversion element; and
a driven member frictionally engaged with the driving member,
wherein the actuator allows the driven member to move along the driving member,
the weight member comprises a member which reduces a resonance frequency of the actuator, and the weight member is an elastic body containing metal powder.

20. The driving mechanism as set forth in claim 19, wherein the elastic body is resin.

21. The driving mechanism as set forth in claim 20, wherein the weight member is coated with a film for suppressing oxidation of the metal powder contained on the weight member.

22. The driving mechanism as set forth in claim 21, wherein the film further acts as an adhesive agent for fixing the weight member to the electro-mechanical conversion element.

23. The driving mechanism as set forth in claim 20, wherein the metal powder is previously treated by anti-oxidation coating.

24. The driving mechanism as set forth in claim 20, wherein the metal powder is previously oxidized at least on its outer surface.

25. The driving mechanism as set forth in claim 20, wherein the resin prevents oxidation of the metal powder.

* * * * *